United States Patent
Bowers, III et al.

(10) Patent No.: US 11,002,641 B2
(45) Date of Patent: *May 11, 2021

(54) SYSTEM FOR SEPARATING PERIODIC AMPLITUDE PEAKS FROM NON-PERIODIC AMPLITUDE PEAKS IN MACHINE VIBRATION DATA

(71) Applicant: Computational Systems, Inc., Knoxville, TN (US)

(72) Inventors: Stewart V. Bowers, III, Knoxville, TN (US); Anthony J. Hayzen, Knoxville, TN (US)

(73) Assignee: Computational Systems, Inc., Knoxville, TN (US)

(*) Notice: Subject to any disclaimer, the term of this patent is extended or adjusted under 35 U.S.C. 154(b) by 3 days.

This patent is subject to a terminal disclaimer.

(21) Appl. No.: 16/515,793

(22) Filed: Jul. 18, 2019

(65) Prior Publication Data

US 2019/0346343 A1 Nov. 14, 2019

Related U.S. Application Data

(63) Continuation-in-part of application No. 15/697,911, filed on Sep. 7, 2017, now Pat. No. 10,416,126, which is a continuation-in-part of application No. 14/316,883, filed on Jun. 27, 2014, now Pat. No. 9,791,422.

(60) Provisional application No. 62/813,863, filed on Mar. 5, 2019, provisional application No. 61/842,035, filed on Jul. 2, 2013.

(51) Int. Cl.
*G01M 99/00* (2011.01)

(52) U.S. Cl.
CPC ............... *G01M 99/005* (2013.01)

(58) Field of Classification Search
CPC ..... G01M 99/005; G01N 29/46; G01N 29/50; G01H 1/00; G01H 1/08
See application file for complete search history.

(56) References Cited

U.S. PATENT DOCUMENTS

| 5,895,857 A * | 4/1999 | Robinson ............... G01H 1/003 73/602 |
| 9,405,291 B2 * | 8/2016 | Sharpe, Jr. ......... G05B 19/4184 |
| 9,791,422 B2 * | 10/2017 | Bowers, III ............. G01H 1/00 |
| 10,416,126 B2 * | 9/2019 | Bowers, III ........... G01N 29/14 |

(Continued)

*Primary Examiner* — Bryan Bui
(74) *Attorney, Agent, or Firm* — Lueeka Neely Group, P.C.

(57) ABSTRACT

A statistical method is used to separate periodic from non-periodic vibration peaks in autocorrelation spectra. Generally, an autocorrelation spectrum is not normally distributed because the amplitudes of periodic peaks are significantly large and random relative to the generally Gaussian noise. In a normally distributed signal, the statistical parameter kurtosis has a value of 3. The method sequentially removes each largest amplitude peak from the peaks in the spectrum until the kurtosis is 3 or less. The removed peaks, which are all considered to be periodic, are placed into a set. The total energy of the peaks in the set is considered to be the total periodic energy of the spectrum. As the process of building the peak set proceeds, if its total energy becomes greater than or equal to a predefined energy threshold before its kurtosis reaches 3 or less, the process stops and the periodic peak set is defined.

19 Claims, 25 Drawing Sheets

(56) References Cited

U.S. PATENT DOCUMENTS

2014/0324367 A1\* 10/2014 Garvey, III ............ G01D 18/00
702/56

\* cited by examiner

PSP = 0.05

PSP = 0.10

PSP = 0.115

PSP = 0.147

PSP = 0.52

Diagnostic Condition Gauges

SYSTEM FOR SEPARATING PERIODIC AMPLITUDE PEAKS FROM NON-PERIODIC AMPLITUDE PEAKS IN MACHINE VIBRATION DATA

RELATED APPLICATIONS

This application claims priority to U.S. provisional patent application Ser. No. 62/813,863 filed Mar. 5, 2019, titled "System for Separating Periodic Amplitude Peaks from Nonperiodic Amplitude Peaks in Machine Vibration Data." This application also claims priority as a continuation-in-part of U.S. non-provisional patent application Ser. No. 15/697,911 filed Sep. 7, 2017, titled "Machine Fault Prediction Based on Analysis of Periodic Information in a Signal," which claims priority as a continuation-in-part of U.S. non-provisional patent application Ser. No. 14/316,883 filed Jun. 27, 2014, titled "Analysis of Periodic Information in a Signal," which claims priority to U.S. provisional patent application Ser. No. 61/842,035 filed Jul. 2, 2013, titled "Periodic Signal Parameter." All of the subject matter described in the above referenced applications is incorporated herein by reference.

FIELD

This invention relates to analysis of signals. More particularly, this invention relates to a system for separating periodic amplitude peaks from nonperiodic amplitude peaks in machine vibration data.

BACKGROUND AND SUMMARY

Periodicity is a term for quantifying how much energy in a signal is periodic. The autocorrelation coefficient function is a mathematical process that can be used to determine how much of the energy in a signal waveform is periodic. The pattern of the periodic peaks—or lack thereof—can be very helpful in identifying fault types. The term "periodic peaks" is a general characterization describing one or more family of harmonic peaks. Periodic peaks related to running speeds of a machine are referred to as synchronous periodic peaks. A family of periodic peaks that are not harmonically related to the running speed (such as bearing and belt frequencies) is referred to as non-synchronous periodic peaks.

Traditionally, recognizing these patterns and how to apply them requires an experienced vibration analyst. The desire is to first calculate an indicator that is representative of general periodic patterns. This value, referred to herein as a "periodic signal parameter" (PSP), is calculated based on statistical measures derived from an autocorrelation waveform of the originating waveform. Based on the peaks in the originating spectrum in combination with the peaks from the spectrum taken from autocorrelation waveform and the PSP value, a Periodic Information Plot (PIP) can be produced. This plot contains only the periodic peaks (synchronous and non-synchronous periodic peaks) from the originating spectra.

An estimate of how much periodicity is present in the original waveform can be determined from the largest amplitude found in the autocorrelated waveform. The square root of the largest amplitude in the autocorrelated waveform is used to estimate Percent Periodic Energy (defined as a percentage of energy in the original spectra that is related to periodic signals). In general, if the value of the PSP is greater than 0.1, or the Percent Periodic Energy is greater than 50%, a periodic signal is present.

By knowing the estimated energy in the original spectrum related to periodic peaks, a "basic" Periodic Information Plot (PIP) can be generated. This "basic" PIP is created by plotting the periodic peaks one peak at a time—starting with the largest peak and continuing in descending order—until the energy in the resulting plot is equal to the Percent Periodic Energy. However, since the Percent Periodic Energy value is an estimate, the resulting "basic" PIP often contains excessive noise.

Described herein is a statistical method to more precisely determine which peaks in the autocorrelation spectrum are periodic. Once the precise periodic peaks are obtained, a "cleaner" (less noisy) PIP can be constructed. The PIP algorithm is described in more detail hereinafter.

The statistical method for separating periodic from non-periodic data in autocorrelation spectra has been developed based on an understanding of the distribution associated with each set of peaks. As a whole, the autocorrelation spectrum is not normally distributed because the periodic peaks are significantly large and random in amplitude relative to the noise floor. However, the noise floor is generally normally distributed (assuming Gaussian noise). Based on this, a method has been devised to separate the periodic peaks from the noise (non-periodic peaks).

A statistical parameter that best characterizes the noise floor is kurtosis. For a normally distributed signal, the kurtosis should have a value of 3. Therefore, after sorting peaks from largest to smallest amplitudes, the kurtosis of the set of peaks is calculated, and the largest peaks are sequentially removed from the set until the kurtosis is equal to a kurtosis threshold. In a preferred embodiment, the kurtosis threshold is 3. In other embodiments, the kurtosis threshold may be 2.9, or 3.1, or some other value near 3. As each large peak is removed from the peak set, the cumulative energy of the remaining peaks in the set is calculated. All the peaks that were culled out (forming a periodic peak set) are considered to be periodic. The energy of the periodic peak set is considered to be the Periodic Energy of the original spectrum. As the process of culling peaks proceeds, if the total energy of the "growing" periodic peak set becomes greater than or equal to the Percent Periodic Energy before the peak set kurtosis reaches a kurtosis threshold of 3 or less, then the process stops, and the periodic peak set is thus defined.

The kurtosis algorithm described herein can be applied to any FFT, not just autocorrelated FFT's. By applying this algorithm to a velocity FFT for instance, the major located peaks can be culled out and used for determining the most influential peaks in an FFT. (These peaks will not necessarily be all the periodic peaks such as can be found when applied to the current disclosure.) These influential peaks can be used as a basis for improving speed detection as well as major harmonic families. The harmonic families can be related to mechanical components generating gear mesh, gear teeth, eccentricity (static and dynamic) and bearings anomalies to name a few.

Implementing the periodicity technology described herein is particularly useful when applied to PeakVue™ data. "PeakVue Plus" refers to a process that combines the PeakVue™ process with the periodicity described herein. Any periodicity that is not a harmonic of a running speed (referred to herein as "non-synchronous periodicity") is typically associated with a bearing fault (such as inner or outer race faults or ball spin or cage faults). The severity of a bearing fault may be determined by the peak amplitude of the associated PeakVue™ waveform. This severity is proportional to the fault levels dictated by the turning speed of the bearing. When a gearbox is under surveillance, any synchronous periodicity is related to the gear teeth health. The severity of gear teeth faults is related to the peak amplitude of the PeakVue™ waveform and is proportional to the fault levels dictated by the associated gear speed. When large peak amplitude values are present in the PeakVue™ waveform and PSP≤0.1, then lubrication issues are suspected in roller element bearings and/or gearboxes.

By determining the periodicity of a waveform, the PIP can be produced to allow an analyst to easily visualize the condition of the machinery being monitored. From this simplified plot, the analysist can predict faults to be acted upon or investigated if desired. Preferred embodiments of a process for generating the PIP is described hereinafter.

Some embodiments described herein provide an apparatus for acquiring and analyzing periodic information in vibration associated with a machine. In one preferred embodiment, the apparatus a vibration sensor, a data collector, and a processor. The vibration sensor is attached to the machine and generates a vibration signal. The data collector, which is in communication with the vibration sensor, receives and conditions the vibration signal. The data collector includes an analog-to-digital converter for converting the vibration signal to digital vibration data. The processor receives the digital vibration data and executes operational instructions for processing the digital vibration data to:
  generate a vibration waveform based on the digital vibration data;
  perform an autocorrelation function on the vibration waveform to generate an autocorrelation waveform;
  perform a Fast Fourier Transform on the vibration waveform to generate a vibration spectrum that includes vibration amplitude peaks;
  perform a Fast Fourier Transform on the autocorrelation waveform to generate an autocorrelation spectrum that includes autocorrelation amplitude peaks;
  compile a first list of the vibration amplitude peaks from the vibration spectrum;
  compile a periodic peak list of the autocorrelation amplitude peaks that includes only autocorrelation amplitude peaks that are not associated with noise in the vibration waveform;
  generate a peak list by sequentially adding to the peak list each vibration amplitude peak from the first list that matches an autocorrelation amplitude peak in the periodic peak list;
  as vibration amplitude peaks are added to the peak list, determine a total amount of peak energy associated with the vibration amplitude peaks in the peak list; and
  after the total amount of peak energy exceeds a predetermined threshold, generate a periodic information plot comprising the vibration amplitude peaks in the peak list.

In some embodiments, the processor compiles the periodic peak list by:
  (a) compiling a second list of autocorrelation amplitude peaks that includes a plurality of largest autocorrelation amplitude peaks from the autocorrelation spectrum;
  (b) calculating a kurtosis value based on amplitudes of all peaks in the second list;
  (c) if the kurtosis value is greater than a kurtosis threshold, moving a peak that has an amplitude larger than amplitudes of any other peaks in the second list from the second list to the periodic peak list; and
  (d) repeating steps (b) and (c) until the kurtosis value is less than or equal to the kurtosis threshold.

In some embodiments, the kurtosis threshold is 3.

In some embodiments, the processor classifies the amplitude peaks as synchronous peaks and nonsynchronous peaks. The processor assigns one or more first display colors to the synchronous peaks in the periodic information plot, and assigns one or more second display colors to the nonsynchronous peaks, wherein the first display colors are different from the second display colors.

In some embodiments, the processor separates amplitude peaks that are synchronous peaks into multiple families and assigned a different display color to each family of synchronous peaks in the periodic information plot.

In some embodiments, the data collector comprises a digital data recorder or a vibration data collector.

In some embodiments, the processor is a component of the data collector or is a component of an analyst computer that is in communication with the data collector via a communication network.

In another aspect, embodiments described herein provide a computer-implemented method for analyzing periodic information in digital vibration data collected for machine performance analysis. A preferred embodiment of the method includes the following steps:
  (a) generating a vibration waveform based on the digital vibration data;
  (b) performing a Fast Fourier Transform on the vibration waveform to generate a vibration spectrum;
  (c) compiling a periodic peak list of vibration amplitude peaks by statistically separating periodic peaks from noise peaks in the vibration spectrum, the compiling including:
    (c1) generating an initial list of vibration amplitude peaks that includes a plurality of largest vibration amplitude peaks from the vibration spectrum;
    (c2) calculating a kurtosis value based on amplitudes of all the vibration amplitude peaks in the initial list;
    (c3) if the kurtosis value is greater than a kurtosis threshold, moving from the initial list to the periodic peak list a vibration amplitude peak having an amplitude that is larger than amplitudes of any other peaks in the initial list; and
    (c4) repeating steps (c2) and (c3) until the kurtosis value is less than or equal to the kurtosis threshold; and
  (d) plotting on a display device machine vibration information comprising or derived from the vibration amplitude peaks in the periodic peak list.

In some embodiments, the kurtosis threshold is 3.

In some embodiments, the vibration waveform is an autocorrelation waveform and the vibration spectrum is an autocorrelation spectrum.

In some embodiments, step (d) includes plotting machine vibration information that is indicative only of periodic information in the digital vibration data.

In some embodiments, the digital vibration data are indicative of vibration of a pump, and step (d) comprises plotting machine vibration information that is indicative of cavitation in the pump.

In another aspect, embodiments described herein provide a computer-implemented method for analyzing periodic information in digital vibration data collected for machine performance analysis. A preferred embodiment of the method includes the following steps:
  (a) generating a vibration waveform based on the digital vibration data;
  (b) performing a Fast Fourier Transform on the vibration waveform to generate a vibration spectrum;

(c) identifying vibration amplitude peaks in the vibration spectrum;

(d) classifying each of the vibration amplitude peaks as a synchronous peak or a nonsynchronous peak;

(e) plotting the synchronous peaks on a display device in one or more first display colors or one or more first line styles; and (f) plotting the nonsynchronous peaks on the display device in one or more second display colors or one or more second line styles that are different from the first display colors and first line styles.

In some embodiments, the method includes separating the vibration amplitude peaks that are classified as synchronous peaks into multiple families, and step (e) comprises plotting each family of synchronous peaks in a first display color or first line style that is different from first display colors or first line styles in which other families of synchronous peaks are displayed.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1A:
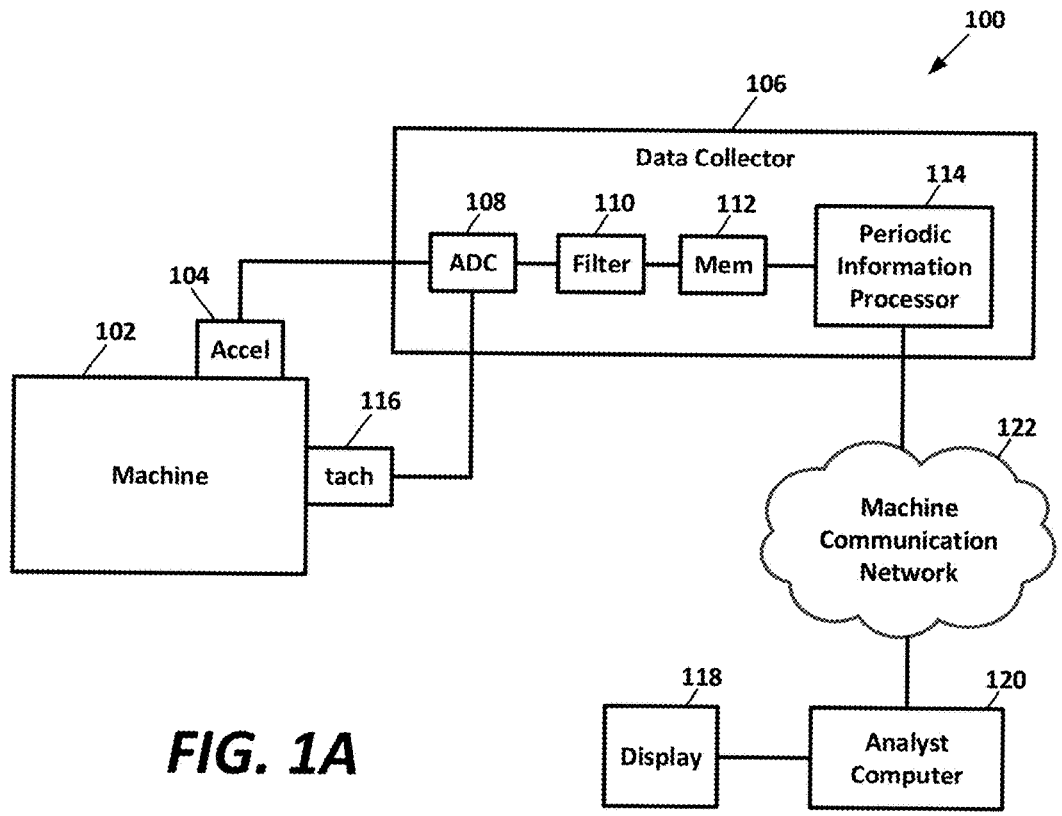
FIGS. 1A and 1B depict functional block diagrams of a system for deriving and analyzing periodic information in a signal according to preferred embodiments of the invention.
Figure 1B:
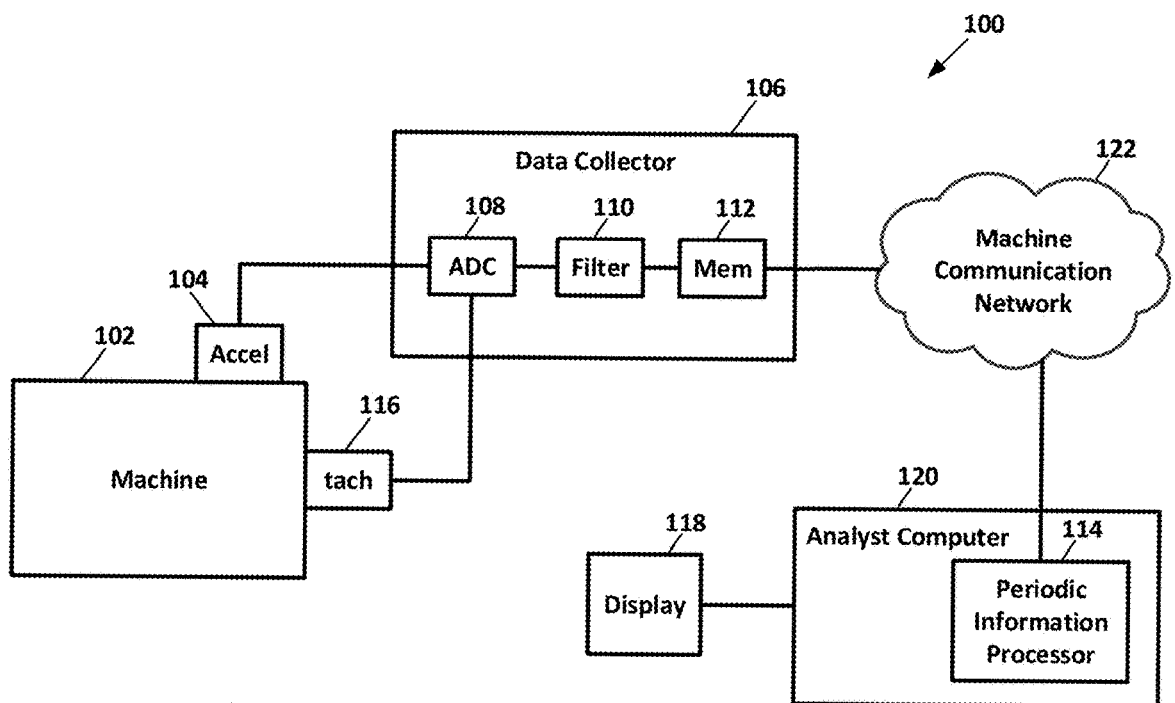

FIGS. 1A and 1B depict exemplary systems 100 for deriving and analyzing periodic information in a vibration signal. In the embodiment of FIG. 1A, a sensor 104, such as an accelerometer, is attached to a machine 102 to monitor its vibration. Although an accelerometer is depicted in the exemplary embodiment of FIG. 1A, it should be appreciated that other types of sensors could be used, such as a velocity sensor, a displacement probe, an ultrasonic sensor, or a pressure sensor. The sensor 104 generates a vibration signal (or other type of signal for a sensor other than an accelerometer) that contains periodic information. For repeatable and best results, it is preferable to place each sensor 104 such that there is a solid path of transition from the signal source (e.g. a bearing) to the mounting location of the sensor. The mounting of the sensor 104 should also be performed to ensure that the signal is sensed with as minimal distortion as possible. Preferred embodiments include one or more tachometers 116 for measuring the rotational speed of one or more rotating components of the machine 102. The vibration and tachometer signals are provided to a data collector 106 preferably comprising an analog-to-digital converter (ADC) 108 for sampling the vibration and tachometer signals, an optional low-pass anti-aliasing filter 110 (or other combination of low-pass and high-pass filters), and buffer memory 112. For example, the data collector 106 may be a digital data recorder, a handheld vibration data collector, or a permanently or temporarily mounted monitoring device. The vibration signal data is communicated to a periodic information processor 114 that performs the information processing tasks described herein. In the embodiment of FIG. 1A, the periodic information processor 114 is a component of the data collector 106. In this embodiment, the periodic information processor 114 communicates processed data via a machine data network 122, which may be a HART™ or WirelessHART™ network, an Ethernet network, or the Internet. An analyst computer 120 receives the processed data via the network 122 for display on a display device 118.

In an alternative embodiment depicted in FIG. 1B, the periodic information processor 114 is a component of the analyst computer 120. This embodiment may be preferable for situations in which data transmission and storage are not a major concern, so that the entire data set can be transferred via the network 122 to the analyst computer 120 or other remote processing device for post-processing using the same algorithms and techniques.

With regard to sensor placement for bearing and gear diagnosis, the sensor 104 is typically mounted orthogonal to the shaft. It is preferably mounted on a rigid and massive piece of metal that is near the source of the signal (i.e. bearing or gear). The large mass of metal on which the sensor is mounted helps prevent resonances entering the signal due to the surface of the machine as opposed to what is happening internal to the machine. The sensor 104 should be mounted so as to minimize loss of signal integrity during transmission. This requires a rigid connection—typically by stud mounting the sensor 104. In some circumstances, such as where the mounting surface of the machine is rough or covered with many layers of paint, the surface will need to be sanded.

Periodic Signal Parameter

Figure 2:
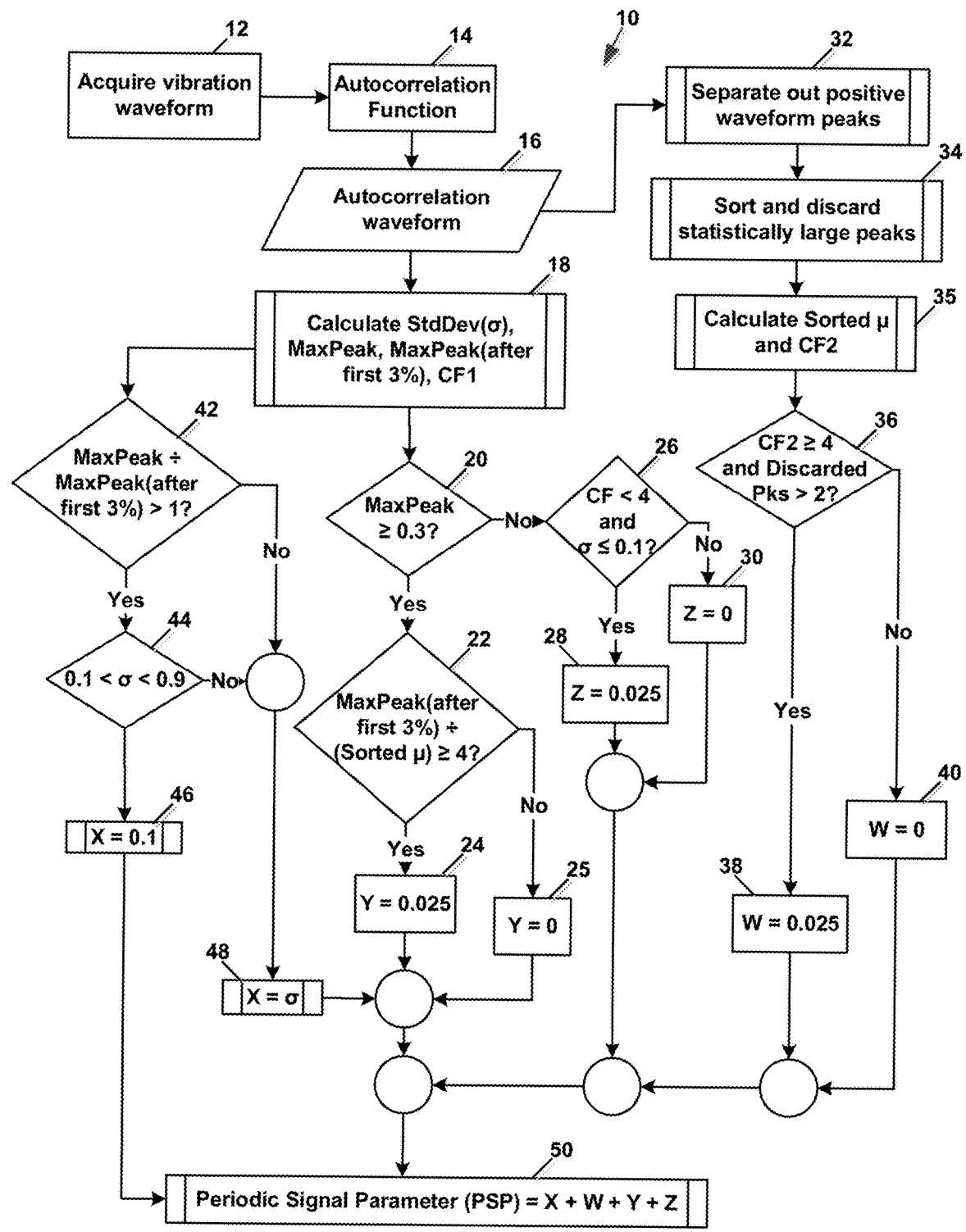
FIG. 2 depicts a flowchart of a method for determining a periodic signal parameter according to a preferred embodiment of the invention.

FIG. 2 depicts a flowchart of a method for calculating a periodic signal parameter (PSP) according to a preferred embodiment of the invention. A time-domain vibration waveform is measured, such as using the accelerometer 104 or other sensor attached to the machine 102 being monitored (step 12). An autocorrelation function is performed on the vibration waveform to determine how much of the energy in the waveform is periodic (step 14). In a preferred embodiment, the autocorrelation function cross-correlates the vibration signal with itself to find repeating patterns within the waveform. The autocorrelation function outputs an autocorrelation waveform 16, examples of which are depicted in FIGS. 3-7. Several statistical characteristics of the autocorrelation waveform are calculated, including the standard deviation (σ), the maximum absolute peak amplitude in the waveform (MaxPeak), the maximum absolute peak after the first 3% of the waveform (MaxPeak(after first 3%)), and the crest factor (CF1) (step 18). The positive waveform peaks are sorted out (step 32), any of those peaks that are statistically too large are discarded (step 34), and the mean amplitude (sorted μ) and the crest factor (CF2) of the remaining peaks are calculated (step 35). Methods for sorting and discarding peaks that are statistically too large are described hereinafter.

If MaxPeak is greater than or equal to 0.3 (step 20) and $$\frac{MaxPeak(\text{after first 3\%})}{\text{sorted } \mu} \geq 4, \quad (\text{step 22})$$

then Y=0.025 (step 24).
If MaxPeak is greater than or equal to 0.3 (step 20) and $$\frac{MaxPeak(\text{after first 3\%})}{\text{sorted } \mu} < 4, \quad (\text{step 22})$$

then Y=0 (step 25).

If MaxPeak is less than 0.3 (step 20) and CF1 less than 4 and σ is less than or equal to 0.1 (step 26), then Z=0.025 (step 28). If MaxPeak is less than 0.3 (step 20) and CF1 is not less than 4 or σ is greater than 0.1 (step 26), then Z=0 (step 30).

If CF2 is greater than or equal to 4 and the number of discarded peaks is greater than 2 (step 36), then W=0.025 (step 38). If CF2 is less than 4 or the number of discarded peaks is not greater than 2 (step 36), then W=0 (step 40).

If $$\frac{MaxPeak}{MaxPeak(\text{after first 3\%})} > 1 \quad (\text{step 42})$$

and σ is between 0.1 and 0.9 (step 44), then X=0.1 (step 46).
If $$\frac{MaxPeak}{MaxPeak \ (\text{after first 3\%})} \leq 1 \quad (\text{step 42})$$

or σ is not between 0.1 and 0.9 (step 44), then X=σ (step 48).

The PSP is the sum of the values of X, W, Y and Z (step 50).

Figure 3:
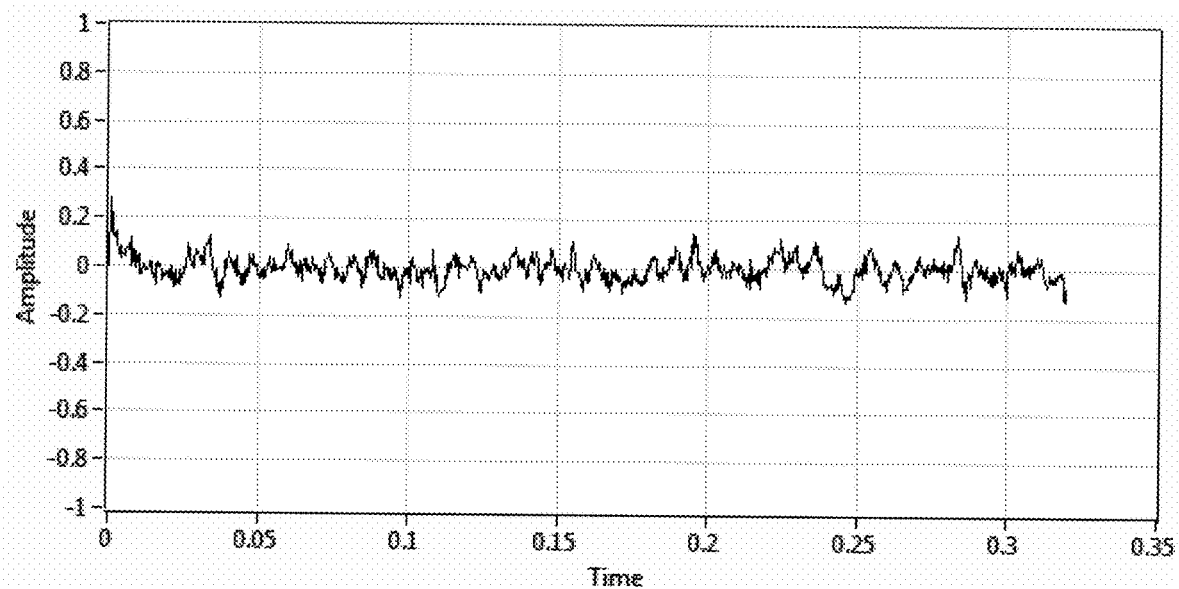
FIGS. 3-7 depict exemplary autocorrelated vibration waveforms for various values of a periodic signal parameter.
Figure 4:
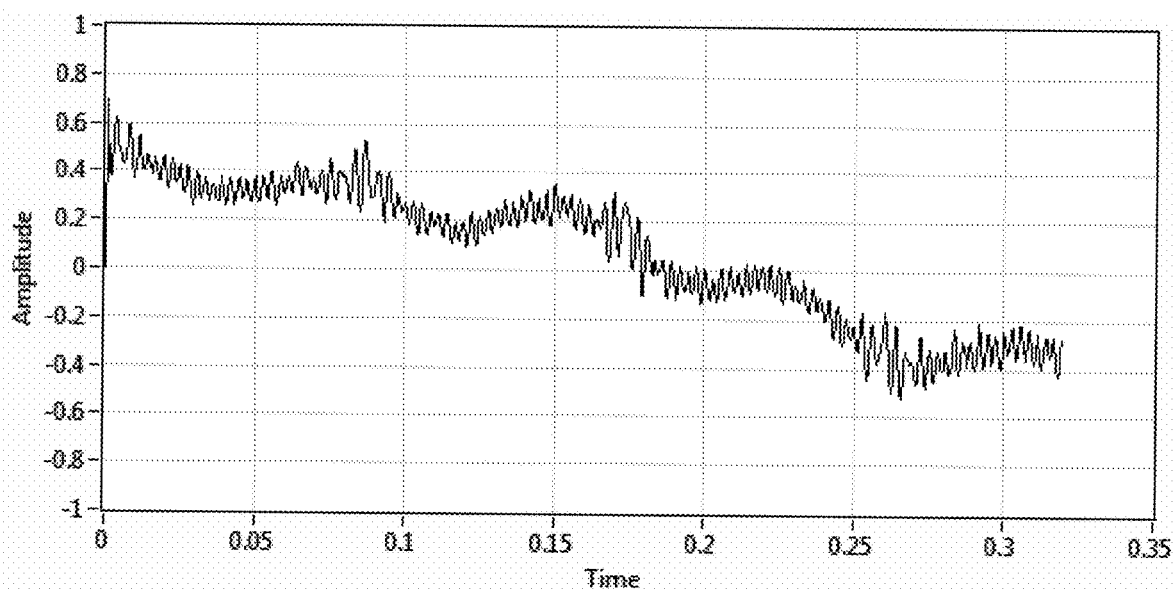
Figure 5:
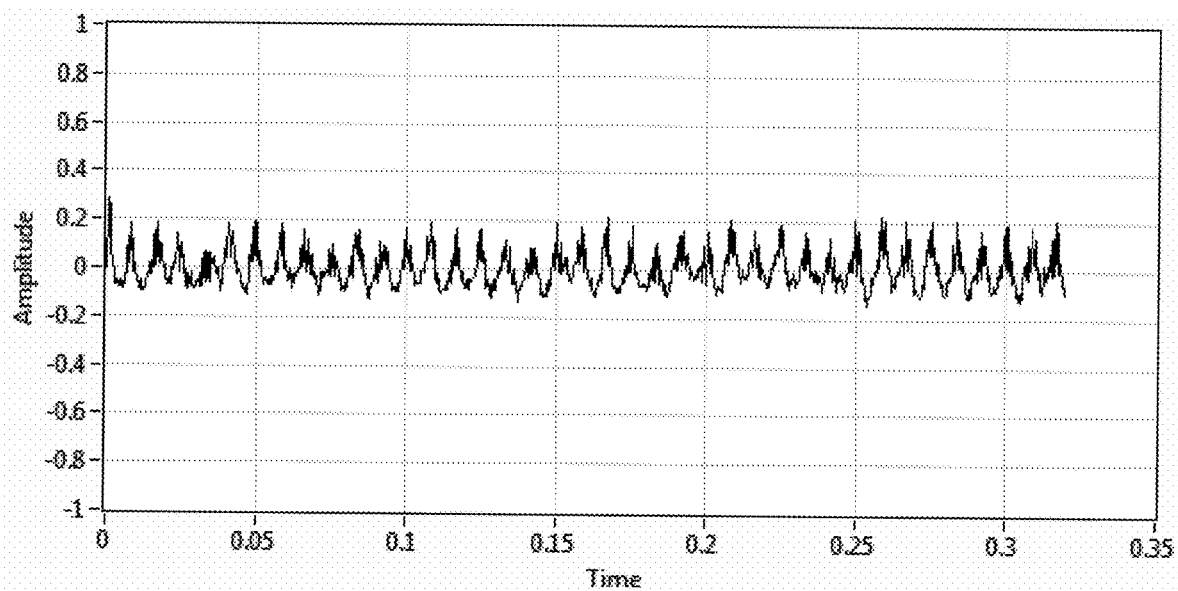
Figure 6:
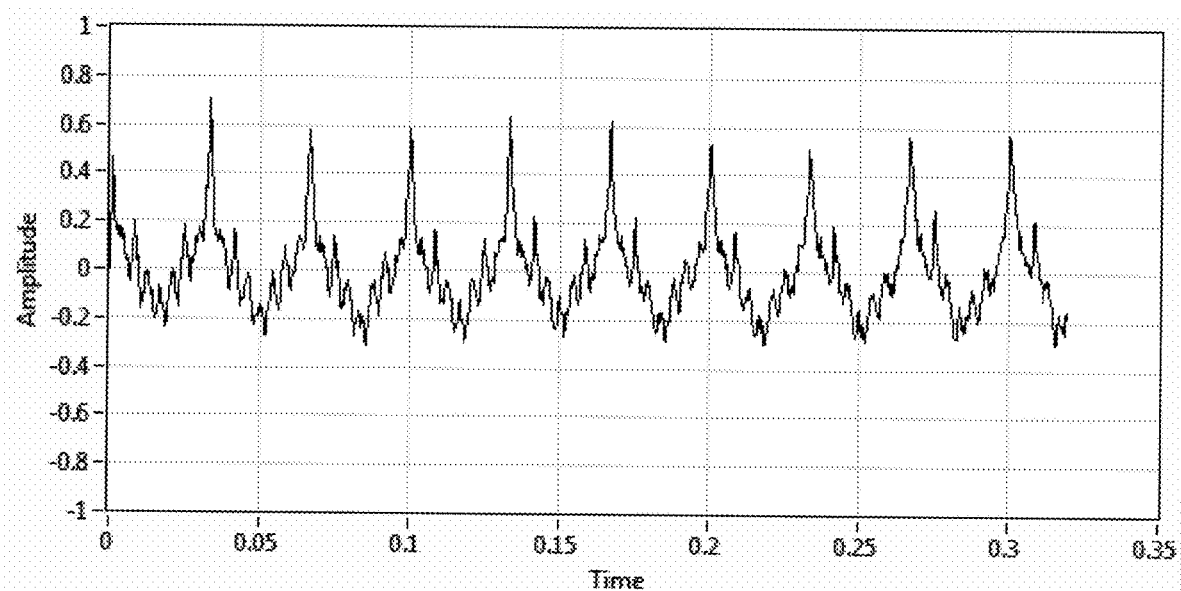
Figure 7:
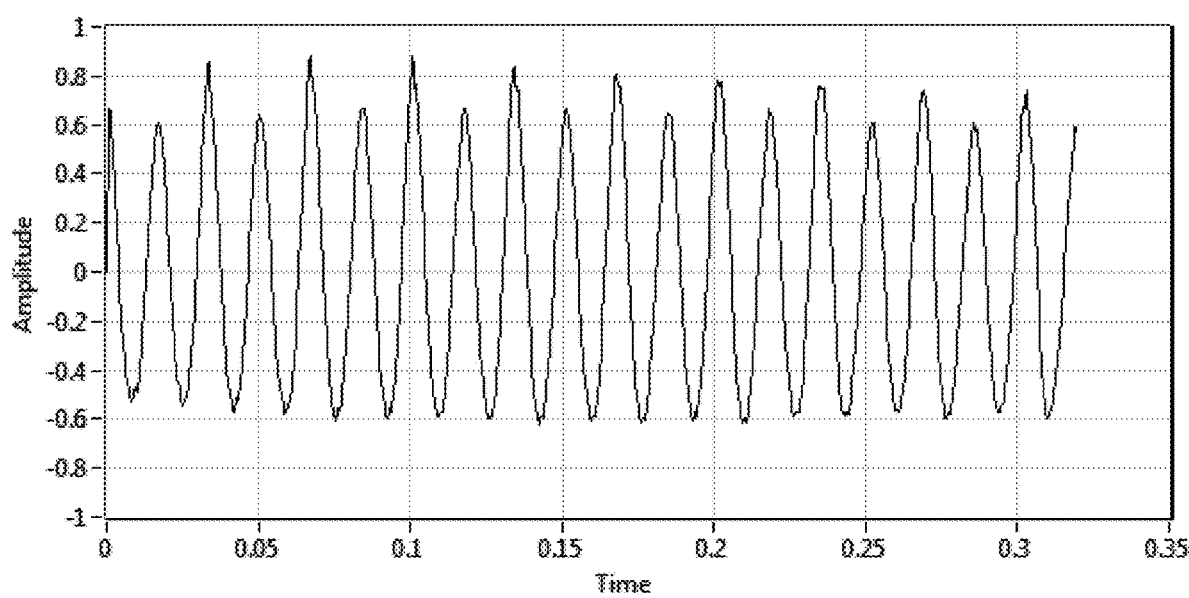

In general, smaller PSP values are indicative of more non-periodic signals and less distinctive frequencies, while larger PSP values are symptomatic of more periodic signals relating to large single frequencies. As shown in FIG. 3, PSP values of less than a first threshold, such as 0.1, indicate that the vibration waveform is mostly non-periodic. As shown in FIG. 4, the algorithm for the PSP assigns a value of 0.1 to signals having low amplitude, higher frequency data. This data may also prove to be bad data. As shown in FIG. 5, PSP values between first and second thresholds, such as between about 0.10 and 0.14, indicate that distinct frequencies are present but there is still a significant amount of non-periodic content. As shown in FIG. 6, PSP values greater than the second threshold, such as greater than about 0.14, indicate very distinctive frequencies that are important to analysis, such as vane pass or ball pass frequencies, along with small amplitude signals indicative of lower frequencies, such as RPM or cage along with their harmonics. As shown in FIG. 7, PSP values greater than a third threshold, such as greater than 0.5 and above, indicate large dominant single frequencies in the spectrum taken from the vibration waveform. The closer the PSP value is to 1.0, the waveform has more periodic signal components and less non-periodic content.

Following are some advantages of generating a PSP.

The PSP provides a single number indicative of the periodic content in a waveform.

Statistical values are calculated from the autocorrelated waveform and one or more of these values are combined to produce the PSP.

Indication of bad data or non-periodic signals is provided.

Information about periodicity can be extracted from a large data set and broadcast via a small bandwidth protocol such as HART®, WirelessHART®, and other similar protocols.

The PSP value may be applied specifically to PeakVue™ data in order to distinguish between periodic and non-periodic faults, such as lubrication, cavitation, bearing, gear and rotor faults.

The PSP value can be used in conjunction with other information to generate an indication of machine condition (i.e. nature of mechanical fault, severity of the fault). The other information may include:

the vibration waveform;

processed versions of the waveform;

information obtained from the original vibration waveform (i.e. peak value, crest factor, kurtosis, skewness);

information obtained from a processed version of the vibration waveform (i.e. PeakVue™ processed, rectified, or demodulated waveform); and/or one or more rule sets.

An example is illustrated in Table 2 below, where derived values representing PSP output and Stress Wave Analysis output (for example, maximum peak in the PeakVue™ waveform or another derivative of PeakVue™ type analysis or another form of stress wave analysis) are used to distinguish between different types of faults. In the majority of cases, the severity of the defect increases as the level of PeakVue™ impacting increases. Although the example below refers to a Stress Wave value, other embodiments may use other vibration waveform information indicative of an impacting or other fault condition.

TABLE 2

PSP and Stress Wave Analyses Outputs

| Stress Wave | Periodic | |
|---|---|---|
| | PSP - Low (PSP < PSP threshold) | PSP - High (PSP > PSP threshold) |
| PeakVue ™ or other stress wave analysis - Low (Stress Wave value < Stress Wave threshold) | No fault indication: no action called for based on this finding | Early stage periodic fault related defect: look for early indication of one of the periodic fault types such as those listed below |
| PeakVue ™ or other stress wave analysis - High (Stress Wave value > Stress Wave threshold) | Non-periodic fault: look for further or confirming evidence of inadequate lubrication or leak or contact friction or pump cavitation | Periodic fault: look for rolling element bearing defect or gear defect or other source of repetitive periodic mechanical impacting - use frequency information and other information to distinguish among multiple possible causes |

A further embodiment of the present invention employs a programmable central processing unit, such as the processor 114, programmed with program logic to assist a user with an interpretation of waveform information. The program logic compares the Periodic Signal Parameter and Stress Wave analysis information with expected or historical or empirically-derived experiential values to discern a relative ranking from low to high. Then discrete or graduated outputs, such as those portrayed in Table 2 above, are employed to select logically arrayed observations, findings, and recommendations. In addition to evaluating PSP and Stress Wave Analysis information, program logic sometimes prompts a user to supply additional information or obtains additional information from another source such as from a knowledge base, to enable the logic to distinguish between two or more possible logical results. For example, program logic that returns a high PSP and a high Stress Wave Analysis finding may select a rolling element defect finding rather than other possible findings within that category because a similarity is calculated when program logic compares a periodic frequency finding and a bearing fault frequency for a machine component identified in a knowledge base.

Another technique to differentiate between lubrication and pump cavitation is to look at the trend of the impacting as indicated by Stress Wave analysis. If it increases slowly, then insufficient lubrication should be suspected. If it increases suddenly on a pump, then it is likely pump cavitation. If combined with logic or inputs on a control system, then the logic could look for process configuration changes that occurred at the same time as the increase in impacting—along with a low PSP—to confirm pump cavitation. In some embodiments, the system suggests to the operator what action caused the cavitation, so that the operator can remove the cause and stop the machine from wearing excessively and failing prematurely.

Periodic Information Plot

A preferred embodiment of the invention creates a new type of vibration spectrum, referred to herein as a Periodic Information Plot (PIP). The PIP provides the user an easily viewed summary of the predominate periodic peaks from the originating spectrum, which would be a PeakVue spectrum in a preferred embodiment.

PIP Generation—First Embodiment

Figure 8:
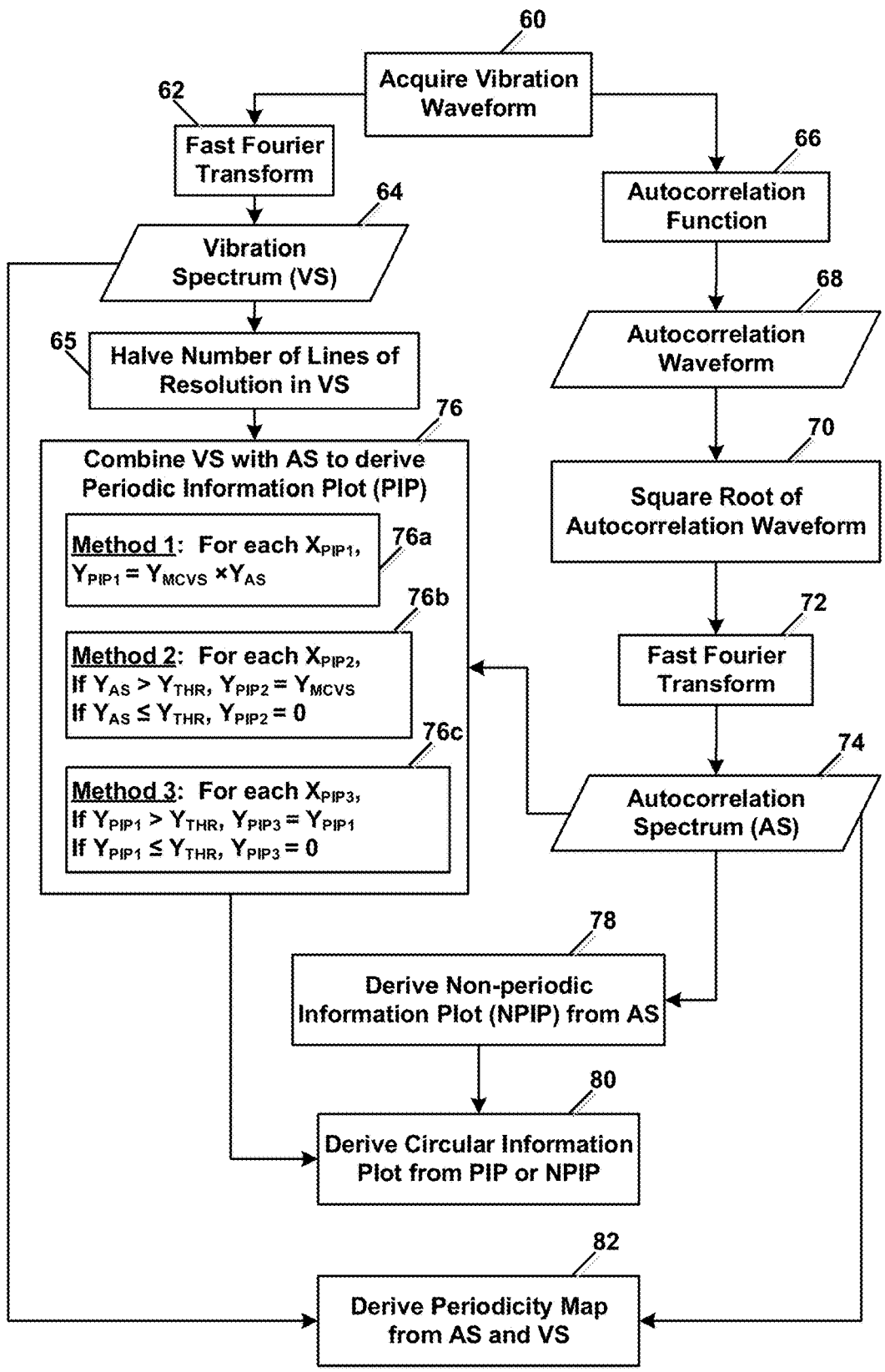
FIG. 8 depicts a flowchart of a method for generating a periodic information plot according to a first embodiment of the invention.

In a first embodiment, a signal is collected from plant equipment (e.g. rotating or reciprocating equipment) and is processed using two different sets of analysis techniques as depicted in FIG. 8.

Figure 9:
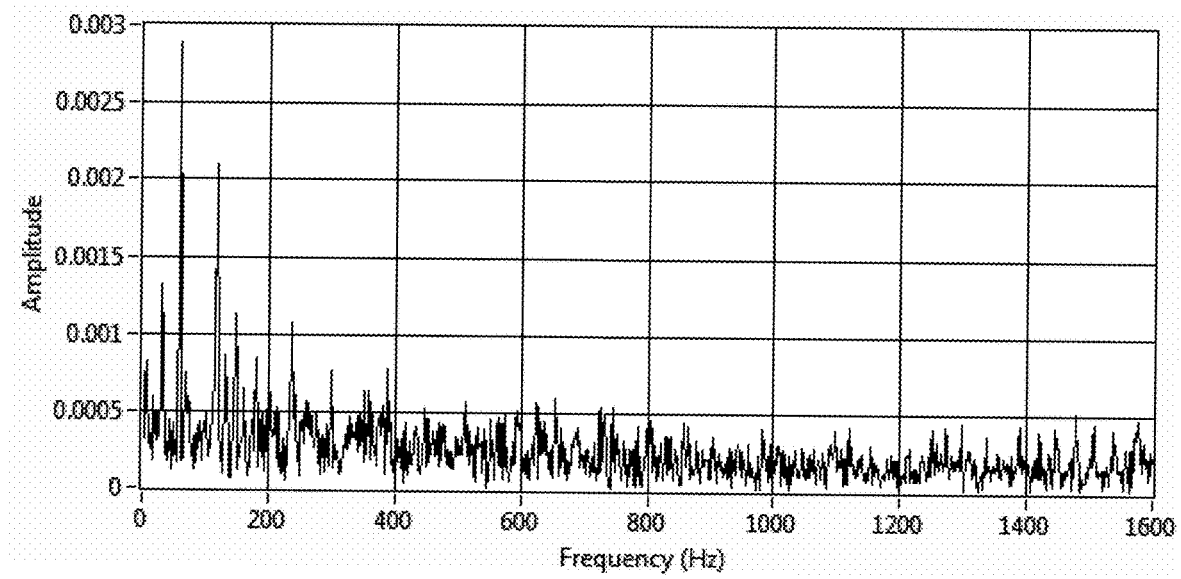
FIG. 9 depicts an exemplary standard vibration spectrum.

First, a waveform is acquired (step 60 of FIG. 8), such as a vibration waveform acquired using the system depicted in FIG. 1A. If employing a high-pass filter and peak-hold decimation to an oversampled waveform to capture impacting information (such as using the PeakVue™ process), this may be a calculated waveform. An FFT of the waveform is taken (step 62), resulting in a vibration spectrum (VS) 64 with frequency on the X-axis and amplitude on the Y-axis, an example of which is shown in FIG. 9.

The waveform from step 60 is also autocorrelated (step 66) to generate a waveform referred to herein as the autocorrelation waveform 68, having time on the X-axis and the correlation factor on the Y-axis. The autocorrelation process accentuates periodic components of the vibration waveform, while diminishing the presence of random events in the original signal. As a result of the autocorrelation calculations, the autocorrelation waveform 68 has half the x-axis (time) values as that of the original vibration waveform 60. Therefore, the timespan of the autocorrelation waveform 68 will be half of that of the original vibration waveform 60. An optional step (70) takes the square root of the autocorrelation waveform (Y-axis values) to provide better differentiation between lower amplitude values.

Figure 10:
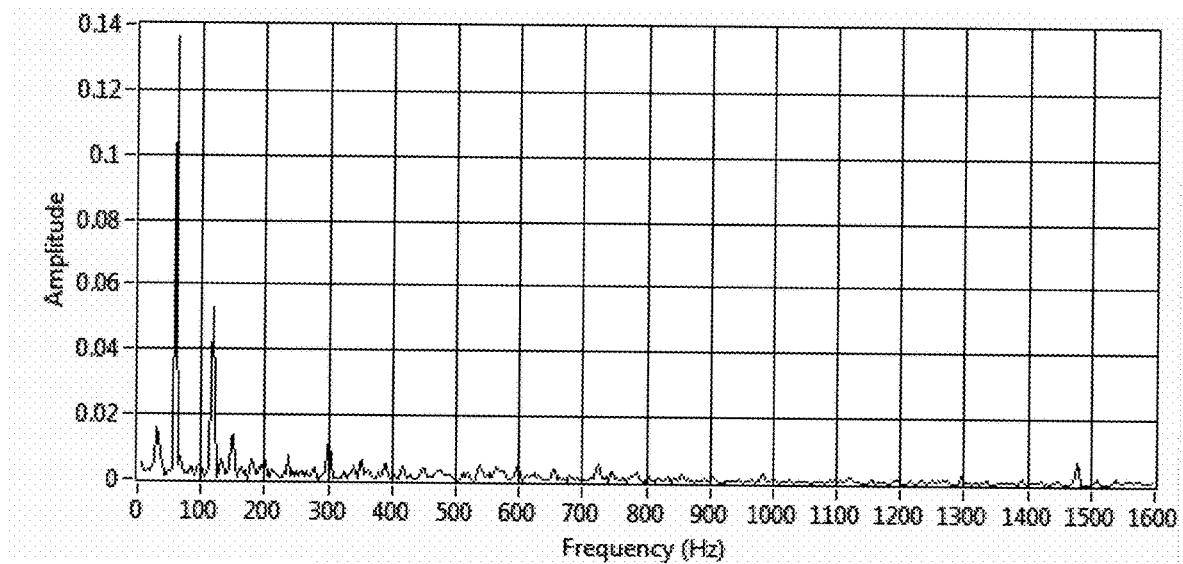
FIG. 10 depicts an exemplary autocorrelated vibration spectrum derived from the spectrum depicted in FIG. 9.

An FFT of the autocorrelation waveform 68 is taken (step 72), resulting in an autocorrelation spectrum (AS) 74. Since random events have largely been removed from the autocorrelation waveform 68, the remaining signal in the autocorrelation spectrum 74 is strongly related to periodic events. As shown in FIG. 10, the autocorrelation spectrum 74 has frequency on the X-axis and amplitude related to the correlation factor on the Y-axis. Because the autocorrelation waveform's duration is half that of the vibration waveform 60, the associated autocorrelation spectrum 74 has half the lines of resolution compared to the vibration spectrum 64.

In the first embodiment, the vibration spectrum 64 and the autocorrelation spectrum 74 are processed to derive a graph referred to herein as the Periodic Information Plot (PIP) (step 76). Several methods for processing the vibration spectrum 64 and the autocorrelation spectrum 74 may be used according to the first embodiment, three of which are described below.

Because the vibration spectrum is twice the resolution of the autocorrelation spectrum, a point-to-point comparison for values on the x-axis (frequency) between the two spectra is not possible. However, a point-to-point comparison can be made by mathematically combining the amplitude values of two x-axis values in the vibration spectrum (step 65) for each associated x-axis value in the autocorrelation spectrum. Each $X_{AS}(n)$ value of the autocorrelation spectrum (where n=1 ... N, and N is the number of lines of resolution for the autocorrelation spectrum) is mapped to the $X_{VS}(2n)$ value on the vibration spectrum. The mathematically combined x-axis value is defined such that $X_{MCVS}(n)=X_{VS}(2n)$. The mathematically combined amplitude values $Y_{VS}(2n)$ and $Y_{VS}(2n-1)$ (herein termed $Y_{MCVS}(n)$) associated with the $X_{MCVS}(n)$ value from the vibration spectrum are calculated from the amplitudes of both the $X_{VS}(2n)$ and $X_{VS}(2n-1)$ frequencies from the x-axis. The calculation for deriving the mathematically combined amplitude value associated with the $X_{MCVS}(n)$ value from the vibration spectrum is:

$$Y_{MCVS}(n) = \sqrt{(Y_{VS}(2n-1))^2 + (Y_{VS}(2n))^2}, \quad \text{Eq. (0)}$$

where n=1 ... N and N is the number of lines of resolution found in the autocorrelation spectrum.

Figure 11:
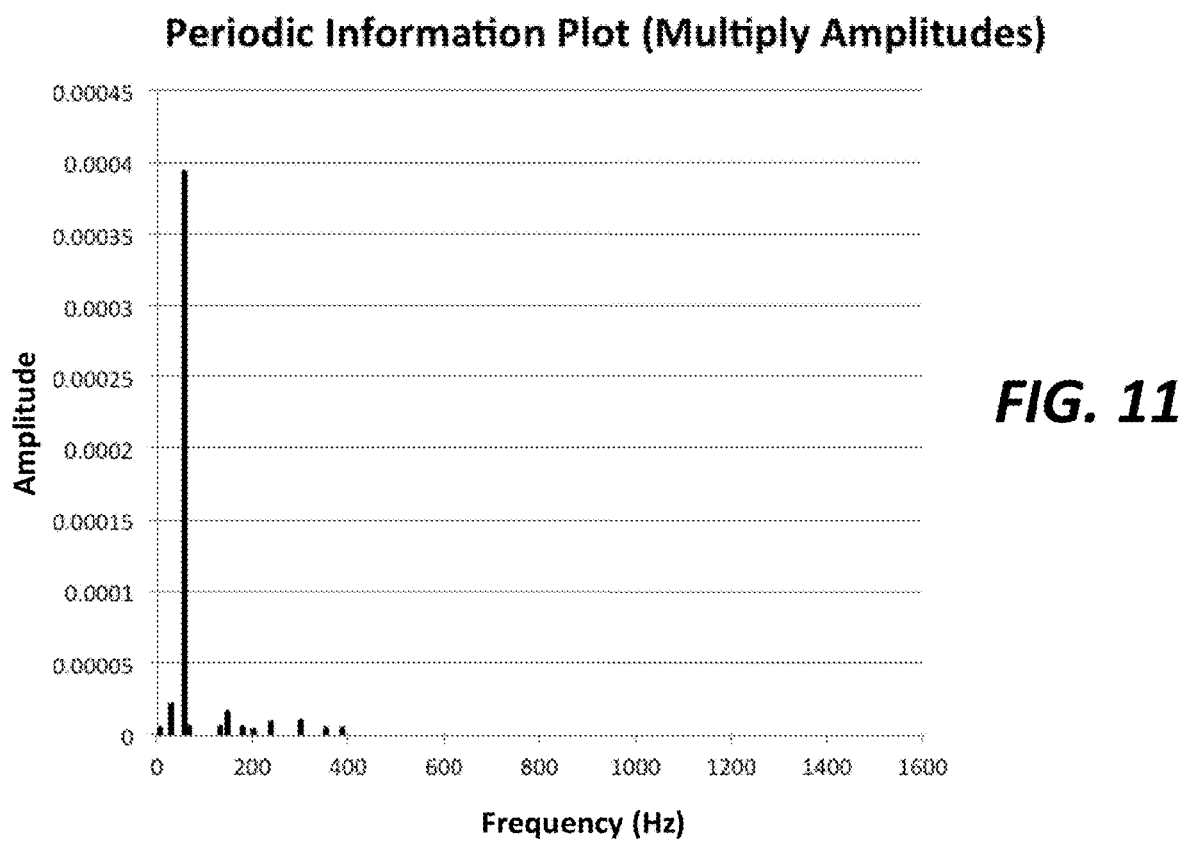
FIGS. 11-17 depict periodic information plots generated based on the spectrum depicted in FIG. 9 according to preferred embodiments of the invention.

In a first method (step 76a), for each X-value in the PIP ($X_{PIP1}$), the Y-value in the PIP ($Y_{PIP1}$) is determined by multiplying the mathematically combined Y-value in the vibration spectrum ($Y_{MCVS}$) by the corresponding Y-value in the autocorrelation spectrum ($Y_{AS}$), according to:

$$Y_{PIP1}(n) = Y_{MCVS}(n) \times Y_{AS}(n) \quad \text{Eq. (1)}$$

for n=1 to N, where N is the number of X-values (frequency values) in the autocorrelation spectrum. Since amplitudes of periodic signals in the autocorrelation spectrum are higher than the amplitudes of random signals, the multiplication process will accentuate the periodic peaks while decreasing non-periodic peaks. An example of a PIP formed by the first method is depicted in FIG. 11. In all of the examples depicted herein, N=1600.

In a second method (step 76b), for each X-value in the PIP ($X_{PIP2}$), the Y-value in the PIP ($Y_{PIP2}$) is determined by comparing the corresponding Y-value in the autocorrelation spectrum ($Y_{AS}$) to a predetermined threshold value ($Y_{THR}$). For each autocorrelation spectrum amplitude greater than this threshold value, the associated amplitude for PIP ($Y_{PIP2}(n)$) will be set to the corresponding mathematically combined value from the vibration spectrum ($Y_{MCVS}(n)$). $Y_{AS}$ values above the predetermined threshold indicate data that is largely periodic. Thus, the $Y_{PIP2}$ values are determined according to:

$$\text{If } Y_{AS}(n) > Y_{THR}, Y_{PIP2}(n) = Y_{MCVS}(n) \quad \text{Eq. (2a)}$$

$$\text{If } Y_{AS}(n) \leq Y_{THR}, Y_{PIP2}(n) = 0 \text{ (or some other default level)} \quad \text{Eq. (2b)}$$

for n=1 to N.

Figure 12:
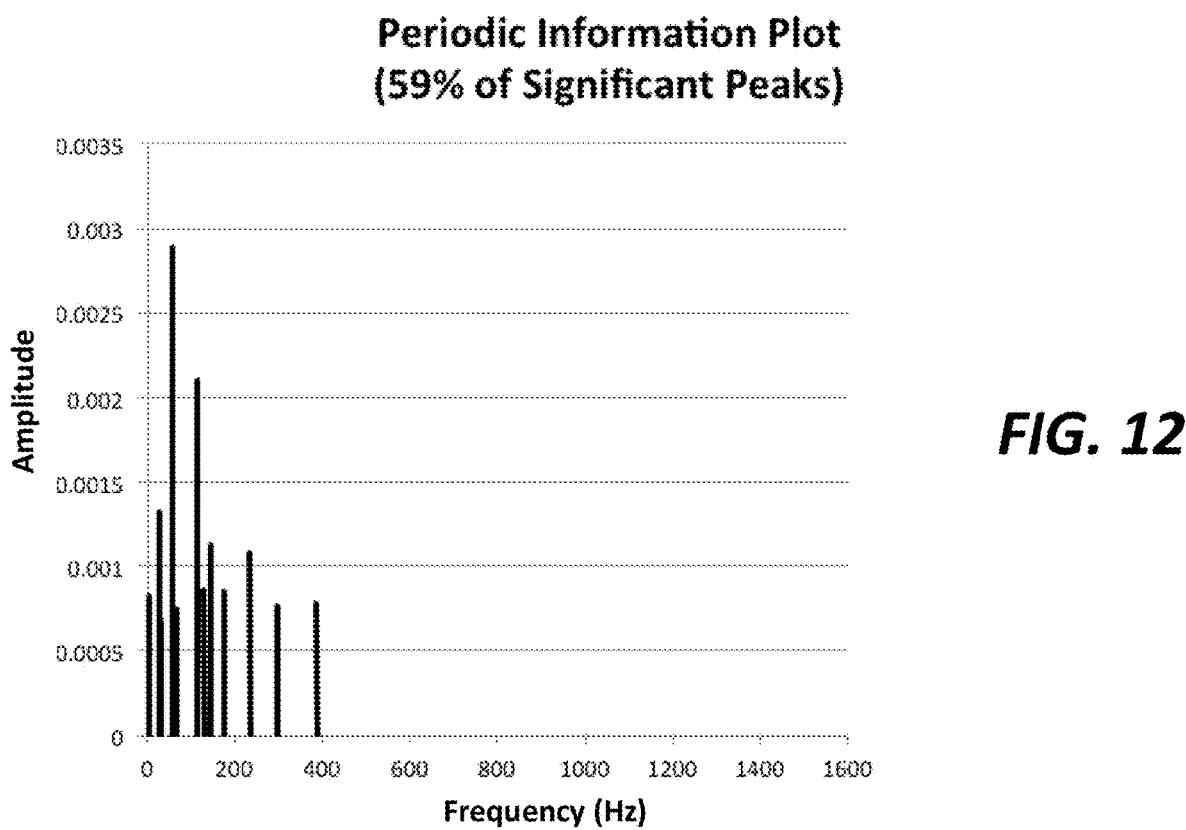

In one preferred embodiment of the second method, $Y_{THR}$ is set to only include a percentage of the largest peaks from the autocorrelation spectrum. The percentage may be calculated based on the percent periodic signal in the autocorrelation waveform. The percent periodic signal is calculated based on the autocorrelation coefficient, which is the square root of the Y-value of the largest peak in the autocorrelation waveform. For this method, only the percent periodic signal of the total number of autocorrelation spectrum peaks will be evaluated. An example of a PIP formed by this method, with $Y_{THR}$ set to 59%, is depicted in FIG. 12.

Figure 13:
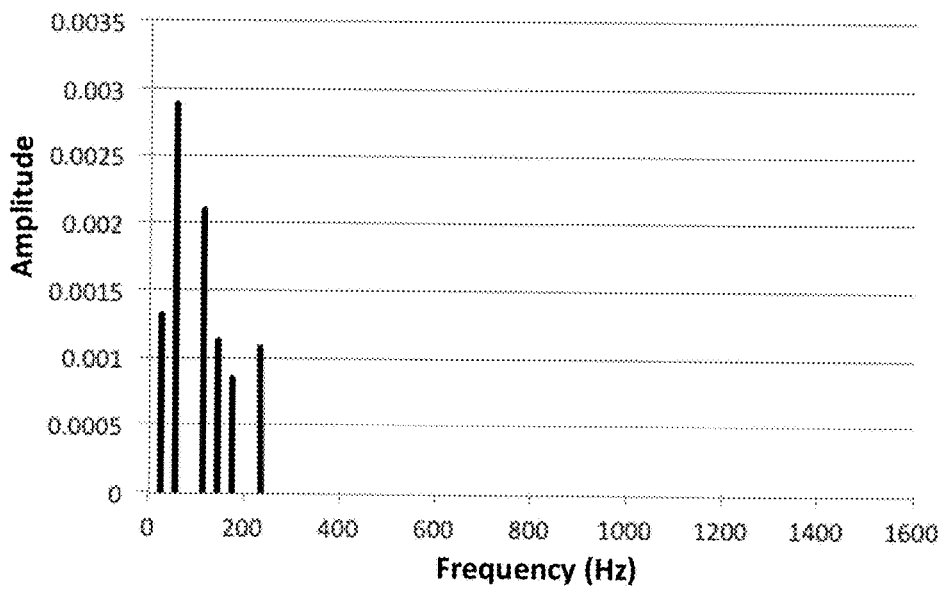

In another preferred embodiment of the second method, $Y_{THR}$ is set to include only peaks with values that are within the "percent periodic signal" of the largest peak value in the autocorrelation spectrum. These peaks, along with their harmonics that appear in the autocorrelation spectrum, will be utilized as the group of peaks to be intersected with those in the vibration spectrum to form the PIP. An example of a PIP formed by this method, with $Y_{THR}$ set to 59%, is depicted in FIG. 13.

Figure 14:
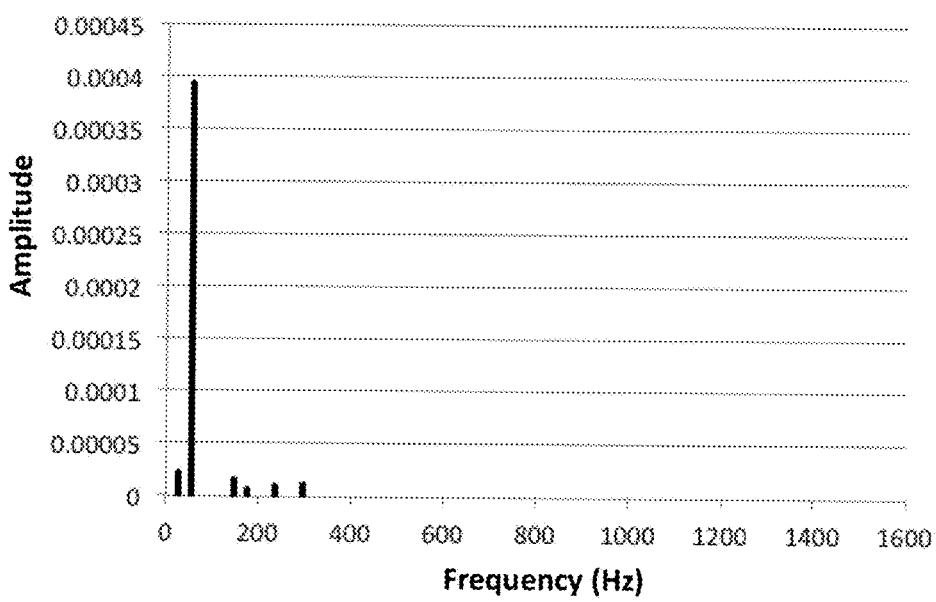

In a third method (step 76c), the PIP is determined according to the first method described above, and then the threshold of the second method is applied to the PIP according to:

$$\text{If } Y_{PIP1}(n) > Y_{THR}, Y_{PIP3}(n) = Y_{PIP1}(n) \quad \text{Eq. (3a)}$$

$$\text{If } Y_{PIP1}(n) \leq Y_{THR}, Y_{PIP3}(n) = 0 \text{ (or some other default level)} \quad \text{Eq. (3b)}$$

for n=1 to N. An example of a PIP formed by this method is depicted in FIG. 14.

Figure 15:
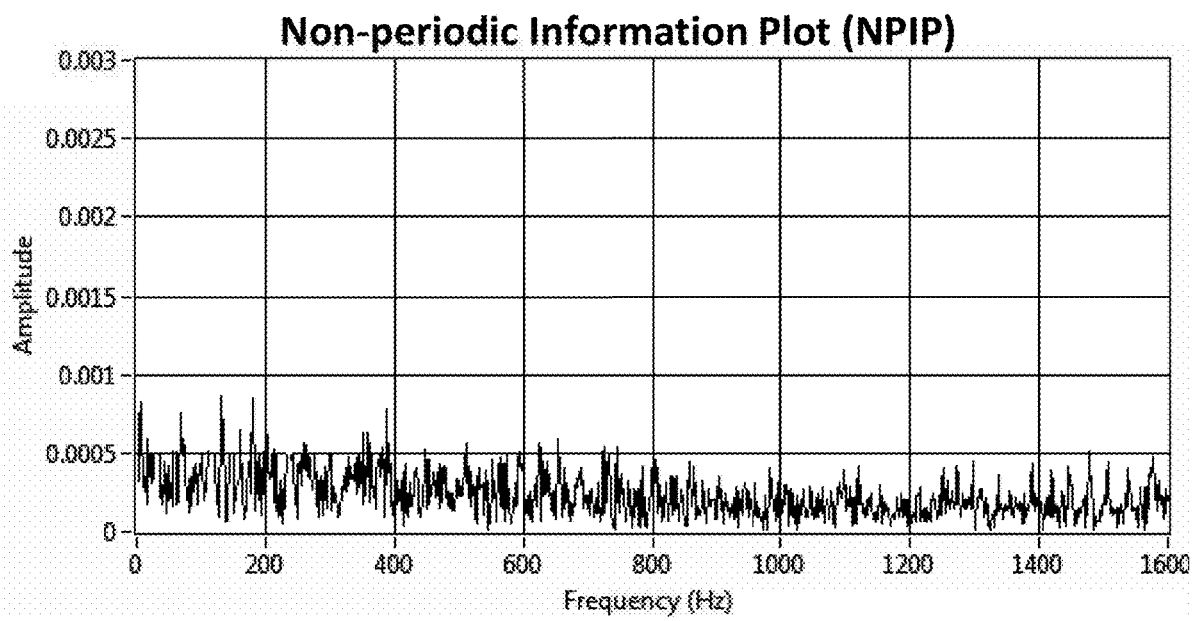

Some embodiments also derive a Non-periodic Information Plot (NPIP) that consists of only the Y-values of the autocorrelation spectrum that are less than a predetermined threshold (step 78). Thus, the NPIP includes only non-periodic components. An example of an NPIP formed by this method is depicted in FIG. 15.

Figure 16:
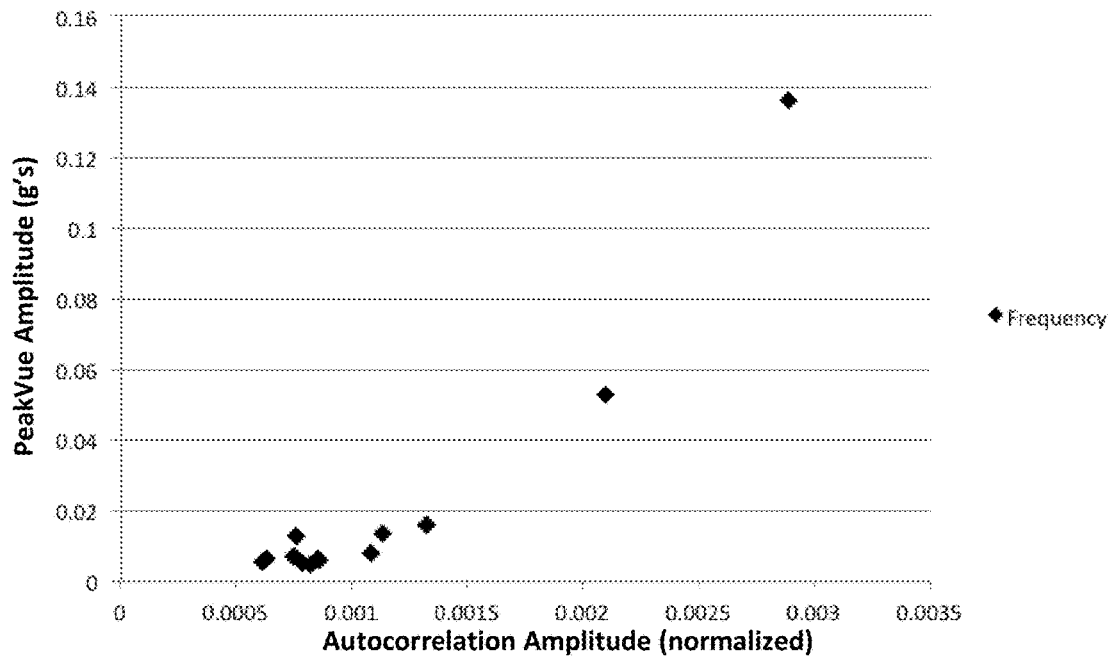

Some embodiments also derive a Periodicity Map from the vibration spectrum and the autocorrelation spectrum (step 82). The Periodicity Map is created by pairing the mathematically combined Y-values from the vibration spectrum and the autocorrelation spectrum corresponding to any given X-value of the autocorrelation spectrum. These pairs are plotted with the mathematically combined Y-value from the vibration spectrum $Y_{MCVS}(n)$ as the X-value of the point on the map $X_{PM}(n)$, and the Y-value from the autocorrelation spectrum $Y_{AS}(n)$ as the corresponding Y-value on the map $Y_{PM}(n)$, according to:

$$X_{PM}(n) = Y_{MCVS}(n) \quad \text{Eq. (4a)}$$

$$Y_{PM}(n) = Y_{AS}(n) \quad \text{Eq. (4b)}$$

for n=1 to N. As shown in FIG. 16, the resulting graph resembles a probability mapping. A specific software implementation would allow the user to run a cursor over each point to view the values creating that point.

Figure 17:
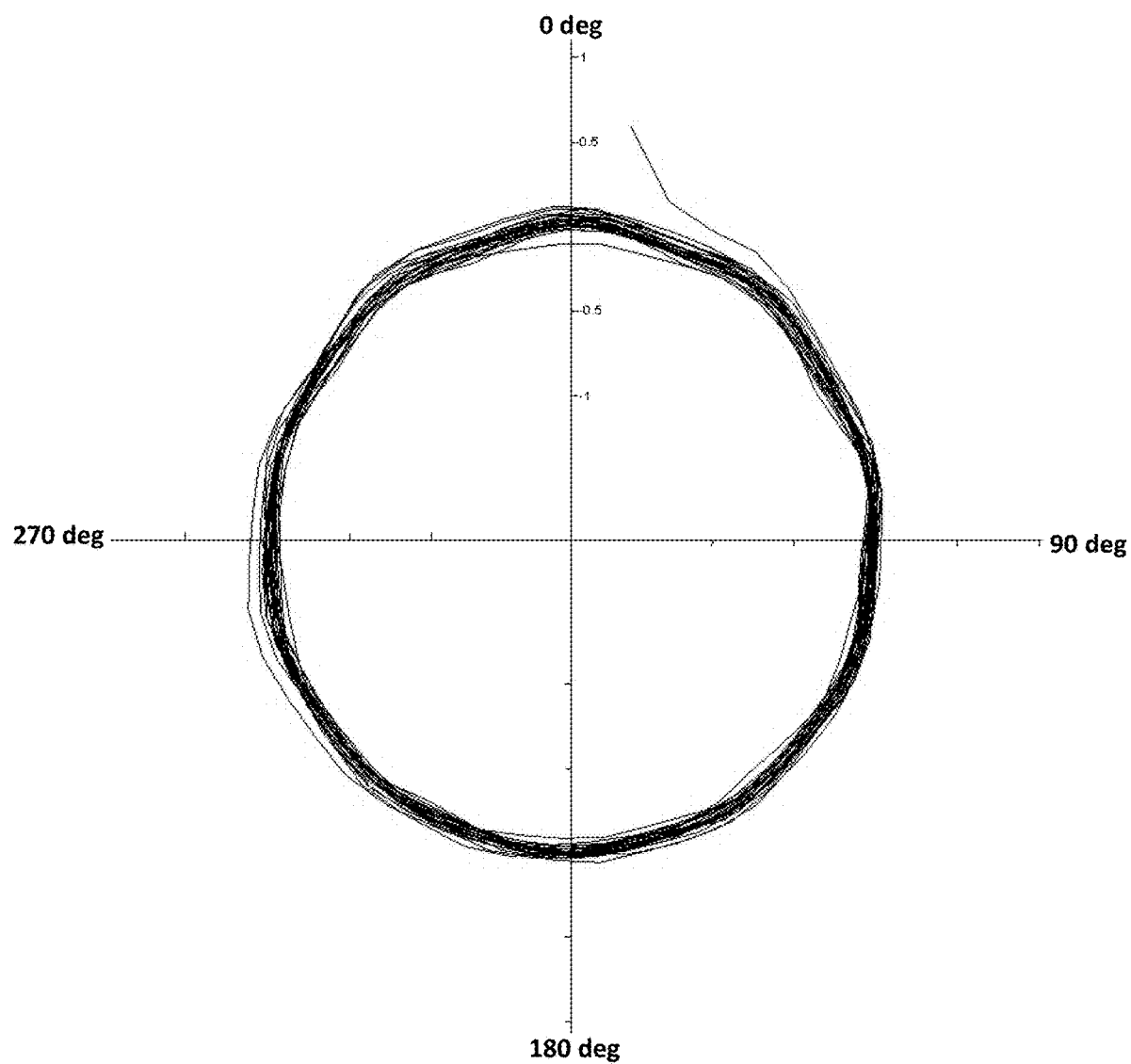

Some embodiments also derive a Circular Information Plot from any of the Periodic Information Plots described above (step 80). Once a linear PIP is calculated, an inverse FFT can be applied to generate an "information waveform." A Circular Information Plot can then be generated from this information waveform. An example of a Circular Information Plot formed by this method is depicted in FIG. 17.

Although preferred embodiments of the invention operate on vibration signals, the invention is not limited to only vibration signals. Periodic Signal Parameters and Periodic Information Plots may be derived from any signal containing periodic components.

PIP Generation—Second Embodiment

Figure 20:
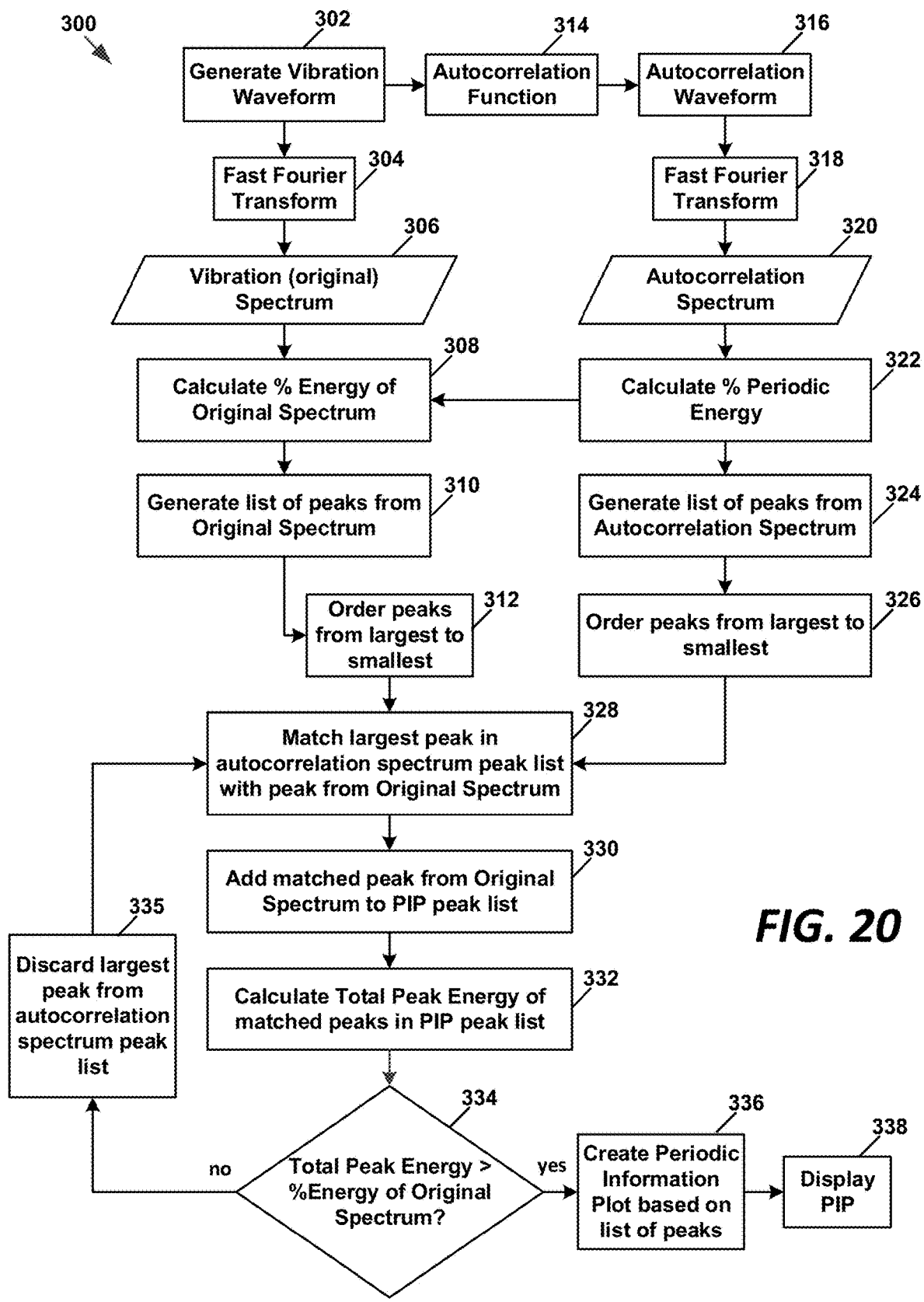
FIG. 20 depicts a flowchart of a method for generating a periodic information plot according to a second embodiment of the invention.

In a second embodiment, a signal is collected from plant equipment (i.e. rotating or reciprocating equipment) and is processed using the method 300 depicted in FIG. 20.

First, a waveform is generated (step 302 of FIG. 20), such as a vibration waveform acquired using the system depicted in FIG. 1A. If employing a high-pass filter and peak-hold decimation to an oversampled waveform to capture impacting information (such as using the PeakVue™ process), this may be a calculated waveform. An FFT of the vibration waveform is taken (step 304), resulting in a vibration spectrum 306 with frequency on the X-axis and amplitude on the Y-axis, an example of which is shown in FIG. 9. The vibration spectrum 306 is also referred to herein as the vibration spectrum to differentiate from the autocorrelation spectrum discussed hereinafter.

The waveform from step 302 is autocorrelated (step 314) to generate an autocorrelation waveform 316, having time on the X-axis and the correlation factor on the Y-axis. An FFT of the autocorrelation waveform 316 is calculated using the same Fmax as was used in the calculation of the FFT of the vibration waveform (step 318), resulting in an autocorrelation spectrum 320. Using the same Fmax forces the lines of resolution (LOR) of the autocorrelation spectrum 320 to be half of the LOR used in calculating the vibration spectrum 306. Since random events have largely been removed from the autocorrelation waveform 316, the remaining signal in the autocorrelation spectrum 320 is strongly related to periodic events. As shown in FIG. 10, the autocorrelation spectrum has frequency on the X-axis and amplitude related to the correlation factor on the Y-axis. Because the autocorrelation waveform's duration is half that of the vibration waveform, the associated autocorrelation spectrum has half the lines of resolution compared to the vibration spectrum.

Percent Periodic Energy (% Periodic Energy) is the percentage of energy in the vibration spectrum 306 that is related to periodic signals. It is calculated at step 322 based on the autocorrelation waveform 316 according to:

$$\% \text{ Periodic Energy} = \sqrt{\frac{\text{MaxPeak (after 3\% of autocorrelation waveform)}}{}}.$$

In a preferred embodiment, the total energy of the vibration spectrum 306 is calculated as the square root of the sum of the squares of each bin value in the vibration spectrum 306 ranging from zero to Fmax. For purposes of finding bearing and/or gear teeth faults, the vibration spectrum 306 is the PeakVue spectrum.

The percent energy of the vibration spectrum 306 is calculated at step 308 according to:

% Energy of Original=Total energy of vibration spectrum×% Periodic Energy.

A list of peaks from the vibration spectrum 306 is generated, wherein each listed peak is a located peak having a located frequency and an associated located amplitude (step 310). A list of peaks from the autocorrelation spectrum 320 is also generated, wherein each listed peak is a located peak having a located frequency and an associated located amplitude (step 324). In both lists, the peaks are arranged in order of descending amplitude, such that the peak having the largest amplitude is first in the list and the peak having the smallest amplitude is last (steps 312 and 326).

For the frequency value of each peak in the peak list generated for the autocorrelation spectrum, an associated matching peak is found in the peak list generated for the vibration spectrum (step 328). For a peak to "match," the frequency value of the peak from the vibration spectrum 306 must be within N×ΔFrequency of the frequency value of the peak from the autocorrelation spectrum 320, where in a preferred embodiment N=4 and ΔFrequency is expressed as:

$$\Delta \text{Frequency} = \frac{F\text{max of original spectrum}}{LOR \text{ of original spectrum}}.$$

Thus, a match exists when

|original peak frequency−autocorrelation peak frequency|≤N×ΔFrequency.

For each matching peak from the vibration spectrum 306 found in step 328, the values of the located frequency and located amplitude is added to a PIP peak list (step 330). As each matching peak is added to the PIP peak list, a running Total Peak Energy value of all peaks in the PIP peak list is calculated (step 332). Because a Hanning window is used in the FFT calculation for this embodiment, the energy of a located peak is the result of energy from three bin values used in the creation of the located peak.

For each Total Peak Energy≤% Energy of Original, discard the associated peak in step 330 from the Autocorrelation Spectrum peak list before returning to step 328 (step 335). This process of matching peaks and adding matched peaks to the PIP peak list continues until Total Peak Energy>% Energy of Original (step 334).

The Periodic Information Plot (PIP) is created by plotting the three points associated with each peak in the PIP peak list (step 336). In the preferred embodiment, the three points correspond to three bins associated with each located peak, assuming a Hanning window is used for FFT calculations. Examples of PIP's created using the method 300 of FIG. 20 are depicted in FIGS. 21 and 23-26.

Periodic Peaks

Periodic peaks in a spectrum are classified as either synchronous or non-synchronous peaks. Synchronous peaks are peaks that occur at the running speed of a shaft and its harmonic frequencies. For a gearbox having multiple shafts, there are also multiple families of synchronous peaks, wherein each family is associated with the speed of a particular shaft in the gearbox. In addition to running speed peaks, synchronous peaks associated with a gearbox also occur at all hunting tooth fundamental frequencies and their harmonics. Non-synchronous peaks are periodic families of harmonic peaks that are not members of a synchronous family. A family of non-synchronous, periodic peaks is most likely related to a bearing defect.

Because there may be many families of peaks related to either synchronous or non-synchronous peaks, a preferred embodiment provides a display color scheme to separate the different families of peaks. By color coding the different families in a spectrum, it is easy to distinguish between frequencies related to bearings (non-synchronous) and those related to running speed. In a gearbox, analysis of these running speed harmonic families (synchronous) can lead to the discovery of gear teeth problems. Using colors to designate the different families of peaks in a spectrum display or in the Periodic Information Plot simplifies the analysis for both the novice and experienced analyst.

Figure 21:
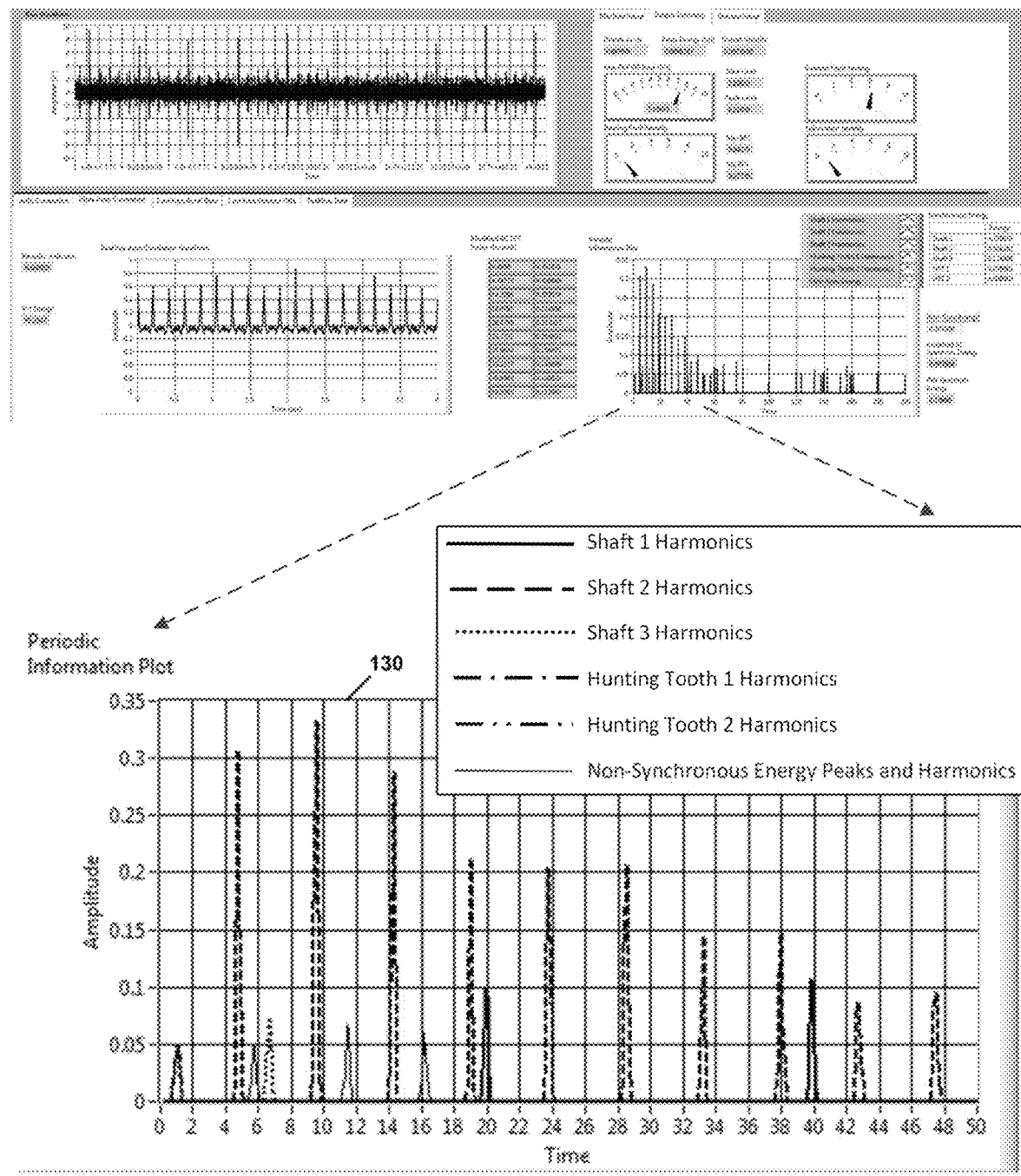
FIG. 21 depicts a graphical display of diagnostic information for a two-stage gearbox having a broken tooth on the bull gear of the second shaft.

FIG. 21 depicts an exemplary display indicating the presence of a broken tooth on a two-stage gearbox. The presence of synchronous and non-synchronous periodic peaks is notable in the Periodic Information Plot (PIP) 130. As indicated in the key provided in FIG. 21, synchronous families of peaks include the running speed fundamental and/or harmonics of "Shaft 1" highlighted in white (represented by large solid lines ———), "Shaft 2" highlighted in red (represented by long dash lines ── ──), and "Shaft 3" highlighted in green (represented by dotted lines ●●●●●●●●●●). Other synchronous families of peaks include hunting tooth fundamental frequencies and their harmonics "HTF 1" highlighted in blue (represented by dash-dot-dash-dot lines ── · ── ·) and "HTF 2" highlighted in yellow (represented by dash-dot-dot lines ── ·· ── ··). Non-synchronous families of peaks are highlighted in purple (represented by thin solid lines ─────). It should be noted that the peaks shown in red (long dash lines) make up the overwhelming number of synchronous family of peaks, all related to the second shaft in the gearbox. In this example, the bull gear on the second shaft has a missing tooth.

Methods for Sorting and Discarding Statistically Outlying Peaks in the Autocorrelation Waveform (Step 34 in FIG. 2).

The following routine takes an array of data values, such as values of positive peaks in the autocorrelation waveform, and discards values outside the statistically calculated boundaries. In a preferred embodiment, there are four methods or criteria for setting the boundaries.

Method 1: Non-Conservative, Using Minimum and Maximum Statistical Boundaries

Consider an array of P values (or elements) where $P_0$ represents the number of values in the present array under evaluation. Now let $P_{-1}$ represent the number of values in the array evaluated a single step before $P_0$, let $P_{-2}$ represent the number of values in the array evaluated a single step before $P_{-1}$, and let $P_{-3}$ represent the number of values in the array evaluated a single step before $P_{-2}$.

Step 1:

---

While evaluating the array of values for either the first time or $P_0 \neq P_{-1}$,
{
    Calculate the mean ($\mu$) and standard deviation ($\sigma$) for $P_0$ If $\dfrac{n\sigma}{\mu} \geq x$, where $x = 0.1$ and $n = 1, 2$ or 3 in the preferred embodiment, then include array values such that
    $\mu - n\sigma <$ values $< \mu + n\sigma$
    Else
        STOP, values are within statistical boundaries.
    Endif
}

---

Step 2:

---

If $P_0 = P_{-1}$, then
    While $P_{-1} \neq P_{-2}$, and $P_0 = P_{-1}$
    {
        Calculate the mean ($\mu$) and standard deviation ($\sigma$) for $P_0$ If $\dfrac{n\sigma}{\mu} \geq x$, where $x = 0.1$ and $n = 1, 2$ or 3 in the preferred embodiment, then include array values such that $$\mu - \frac{n\sigma}{2} < \text{values} < \mu + \frac{n\sigma}{2}$$

Else
        STOP, values are within statistical boundaries.
    Endif
    }
Endif

---

Step 3:

---

If $P_0 = P_{-1} = P_{-2}$, and $P_{-2} \neq P_{-3}$, then
    Calculate the mean ($\mu$) and standard deviation ($\sigma$) for $P_0$
    Include array values such that
    $0.9\mu <$ values $< 1.1\mu$
Else
    STOP, values are within statistical boundaries.
Endif

---

Method 2: Non-Conservative, Using Maximum Statistical Boundary Only (No Minimum Boundary)

Use the same procedure as in Method 1 except only values exceeding the upper statistical boundaries are discarded. The minimum boundary is set to zero.

Method 3: Conservative, Using Minimum and Maximum Statistical Boundaries

Discard values based on Method 1, Step 1 only.

Method 4: Conservative, Using Maximum Statistical Boundary Only (No Minimum Boundary)

Discard values based on Method 1, Step 1 only and based on values exceeding the upper statistical boundaries. The minimum boundary is set to zero.

Example of Method 1 for Sorting Out Statistical Outliers

As an example of the sorting Method 1, consider an original set of values, $P_0$, containing the twenty-one values listed below in Table 3 below, with $n=1$.

TABLE 3

| |
|---|
| 0.953709 |
| 0.828080 |
| 0.716699 |
| 0.653514 |
| 0.612785 |
| 0.582031 |
| 0.579209 |
| 0.557367 |
| 0.545801 |
| 0.495215 |
| 0.486426 |
| 0.486053 |
| 0.475123 |
| 0.472348 |
| 0.467129 |
| 0.465488 |
| 0.446327 |
| 0.440497 |
| 0.437959 |
| 0.427256 |
| 0.411627 |

The mean ($\mu$) of this original set, $P_0$, is 0.54955 and standard deviation ($\sigma$) is 0.13982. Therefore, in Step 1 of Method 1, $$\frac{n\sigma}{\mu} = 1 * \frac{0.13982}{0.54955} = 0.25442.$$

Since 0.25442 is greater than 0.1, calculate $$\mu-n\sigma=0.54955-1*0.13982=0.409735$$

and $$\mu+n\sigma=0.54955+1*0.13982=0.689373.$$

Next, define the set $P_{-1}=P_0$ and define a new set $P_0$, the values of which are all the values of $P_{-1}$ that are between the values $\mu+\sigma=0.689343$ and $\mu-\sigma=0.409735$. The set $P_0$ now contains the values listed below in Table 4, wherein three outlier values have been eliminated.

TABLE 4

| |
|---|
| 0.653514 |
| 0.612785 |
| 0.582031 |
| 0.579209 |
| 0.557367 |
| 0.545801 |
| 0.495215 |
| 0.486426 |
| 0.486053 |
| 0.475123 |
| 0.472348 |
| 0.467129 |
| 0.465488 |
| 0.446327 |
| 0.440497 |
| 0.437959 |
| 0.427256 |
| 0.411627 |

Since $P_0 \neq P_{-1}$, Step 1 is repeated, where for the set $P_0$:

$$\mu=0.50234,$$

$$\sigma=0.06946,$$

$$\sigma/\mu=0.138263,$$

$$\mu+\sigma=0.571797, \text{ and}$$

$$\mu-\sigma=0.432887.$$

Now define the set $P_{-2}=P_{-1}$, and $P_{-1}=P_0$ and define a new set $P_0$, the values of which are all the values of $P_{-1}$ that are between the values $\mu+\sigma=0.571797$ and $\mu-\sigma=0.432887$. The set $P_0$ now contains the values listed below in Table 5, wherein four more outlier values have been eliminated.

TABLE 5

| |
|---|
| 0.557367 |
| 0.545801 |
| 0.495215 |
| 0.486426 |
| 0.486053 |
| 0.475123 |
| 0.472348 |
| 0.467129 |
| 0.465488 |
| 0.446327 |
| 0.440497 |
| 0.437959 |

Since $P_0 \neq P_{-1}$, Step 1 is repeated, where for the set $P_0$:

$$\mu=0.481311,$$

$$\sigma=0.037568, \text{ and}$$

$$\sigma/\mu=0.078053.$$

Since $$\sigma/\mu=0.078053 \leq 1,$$

all the members of the array $P_0$ are statistically close in value and need no more sorting.

If at any point in the calculations $P_0=P_{-1}$ and $P_{-1} \neq P_{-2}$, then Step 2 would be executed instead of Step 1. In the example above, since $P_0 \neq P_{-1}$ for every iteration, only Step 1 was necessary for the calculations.

Predicting Bearing Faults Based on Periodic Signal Parameter (PSP)

Figure 22:
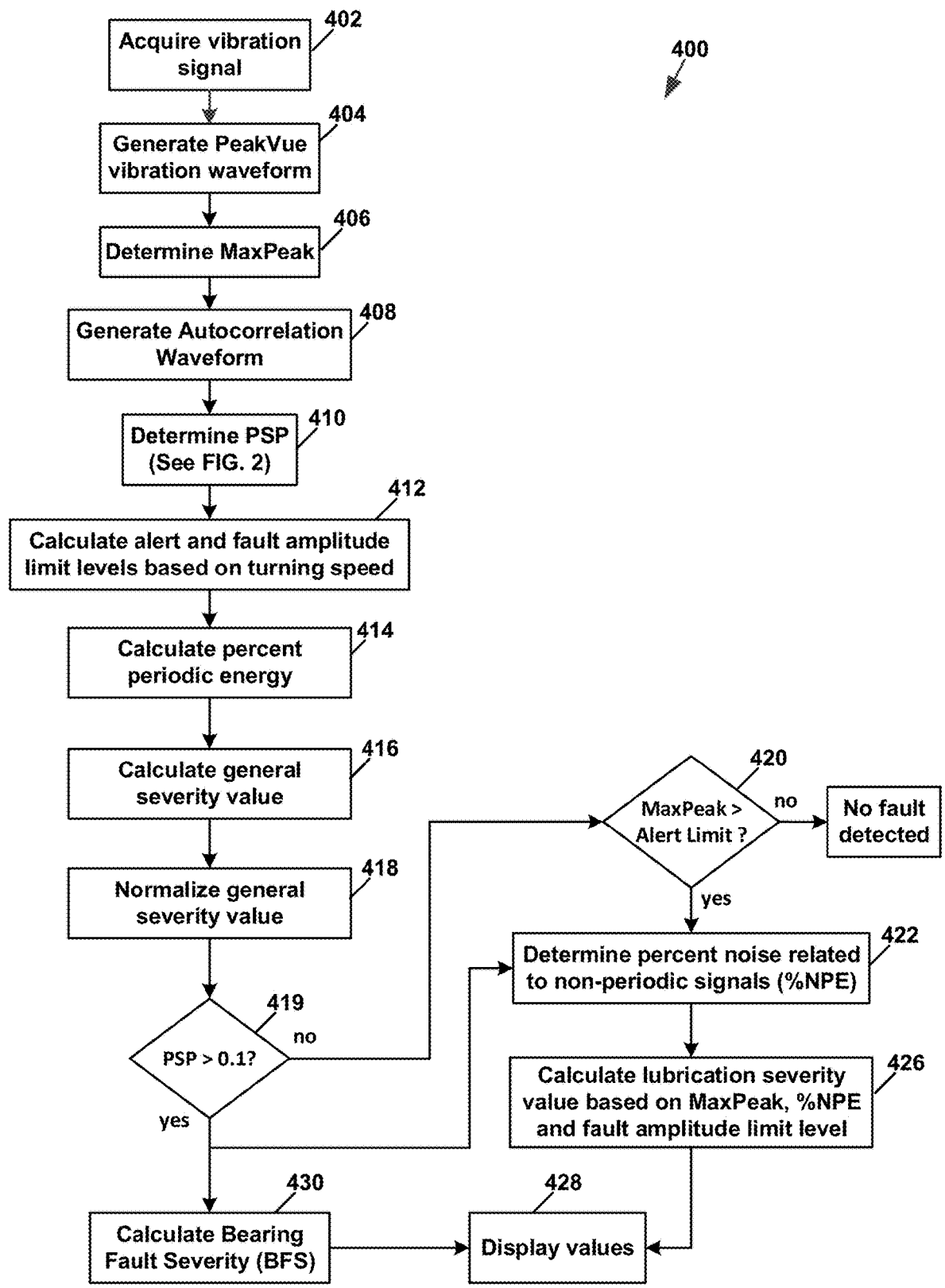
FIG. 22 depicts a flowchart of a method for determining a bearing fault severity value and a lubrication severity value according to a preferred embodiment of the invention.

FIG. 22 depicts steps in a preferred embodiment of a method 400 for generating bearing fault condition information. A time-domain oversampled vibration waveform is measured (step 402), such as using the accelerometer 104 or other sensor attached to the machine 102 being monitored. A PeakVue™ waveform is then generated (step 404), such as by high-pass filtering and peak-hold decimating the oversampled waveform. The maximum peak amplitude (MaxPeak) of the PeakVue™ waveform is determined (step 406), and its associated autocorrelation waveform is calculated (step 408). Based on the autocorrelation waveform, the periodic signal parameter (PSP) is calculated according to the method depicted in FIG. 2 (step 410).

Figure 28:
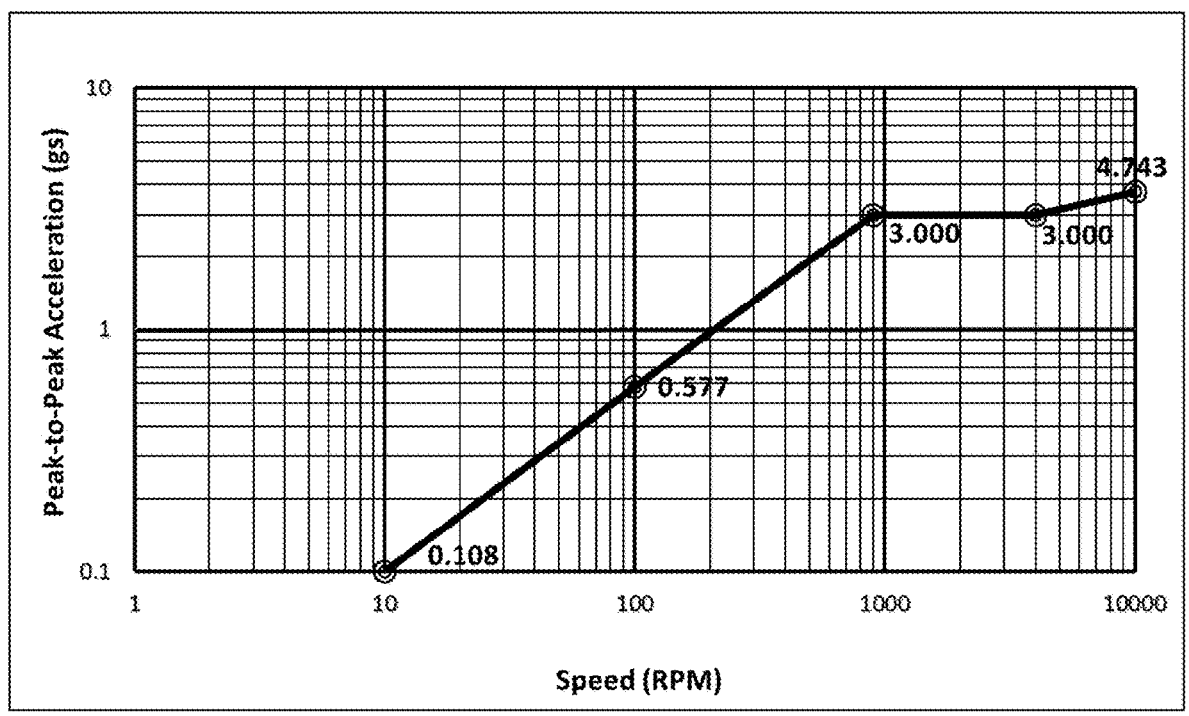
FIG. 28 depicts an exemplary graph of representative alert levels for a PeakVue waveform for an inner race bearing fault determined according to one embodiment.

In a preferred embodiment, alert amplitude limit levels (in g's) are determined based on the nominal turning speed according to the relationship depicted in FIG. 28 (step 412). Fault amplitude limit levels are preferably two times the alert levels. FIG. 28 provides a graphical representation of one method for determining alert limits for a PeakVue signal based on the RPM of the machine shaft. The alert level would be compared to the peak value occurring in the PeakVue waveform and applies for a developing inner race fault. It will be appreciated that the alert limit levels depicted in FIG. 28 are suggestions only, and the analyst may decide to use values that have been determined to be optimal for their machine. In some situations, the analyst may start out using the values from FIG. 28, and then adjust them based on experience.

Figure 19:
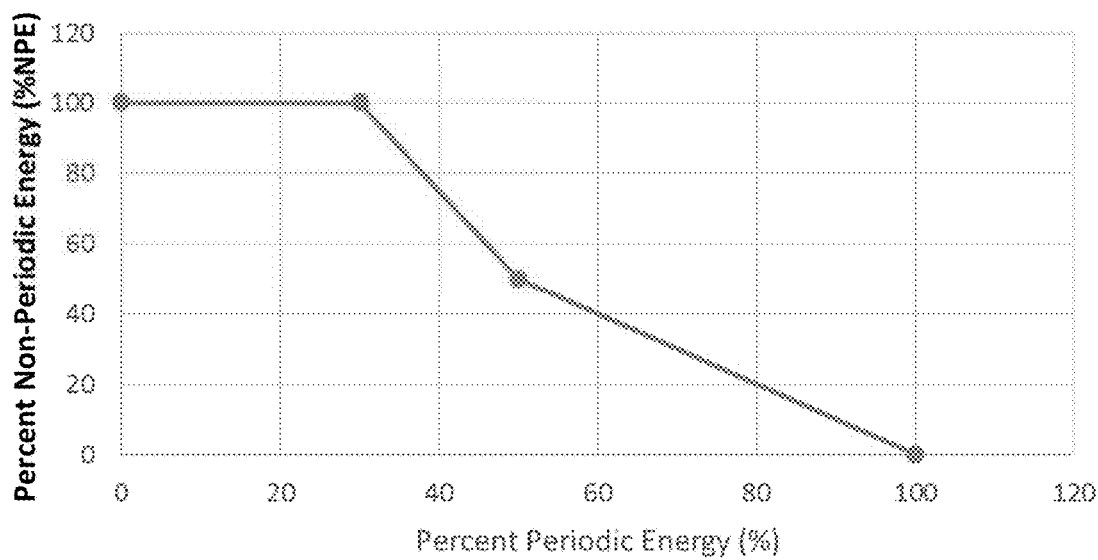
FIG. 19 depicts a plot of energy calculated from an autocorrelation waveform in relation to random vibration noise and other non-periodic energy present in a vibration signal.

Before calculations of severity values can be made, Percent Periodic Energy must be calculated. Percent Periodic Energy (step 414) is calculated from the autocorrelation waveform according to:

$$\% \text{ Periodic Energy} = \sqrt{\text{MaxPeak(afterfirst3\%)}}$$

wherein the maximum peak in the autocorrelation waveform does not include the first 3% of the waveform. Generally, the Percent Periodic Energy calculation is not as accurate for values less than 50%. Accordingly, as indicated in FIG. 19, the slope of the function for values less than 50% is greater than 1.0. Therefore, the percent periodicity is not determined for values less than 50%. A general severity value is necessary for all severity estimates, which is calculated according to:

$$\text{General Severity} = \frac{\text{MaxPeak}}{2 \times \text{Fault Limit}} \text{ (step 416).}$$

In a preferred embodiment, the severity value is normalized by multiplying the result of step 416 by a desired maximum gauge value x according to:

Normalized General Severity=General Severity×$x$ (step 418).

Figure 18:
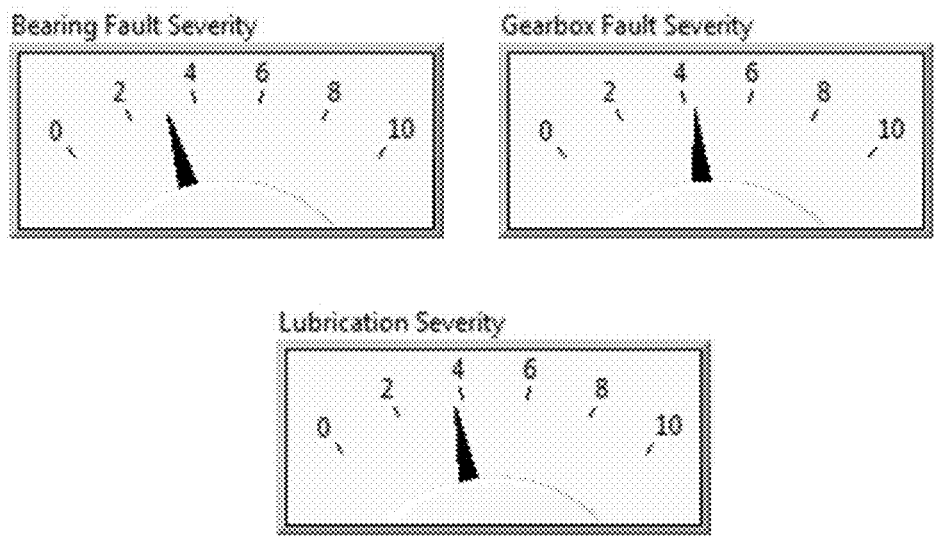
FIG. 18 depicts a graphical representation of diagnostic fault condition gauges according to a preferred embodiment.

For the gauges shown in FIG. 18, where $x=10$,

Normalized General Severity=General Severity×10.

If the PSP is greater than 0.1 (step 419), a bearing fault is possibly present. Bearing Fault Severity (BFS) may be calculated according to:

BFS=Normalized Severity×% Periodic Energy (step 430).

If the resulting answer is greater than x (10 in this example), then the answer is truncated to be x.

In some embodiments, knowledge of the turning speed improves confidence that the periodicity is related to bearing faults and not turning speed incidences. When the turning speed is known, periodic peaks from the periodic information plot (PIP) can be classified as synchronous and non-synchronous. If only synchronous peaks are present, no bearing fault is indicated. If significant non-synchronous peaks are present, a possible bearing issue is confirmed, as indicated by:

$$BFS = \text{Normalized Severity} \times \left[\left(\frac{(\text{energy of the located nonsynchronous peaks})^2}{(\text{total energy of the associated } PeakVue \text{ spectrum})^2}\right)\right].$$

If PSP≤0.1 and MaxPeak is <alert level, no fault is indicated by the measurement, meaning the asset is in good condition.

If PSP is less than or equal to 0.1 and MaxPeak is greater than the alert amplitude limit level (step 420), a deficiency in bearing lubrication is indicated. In addition, there may be lubrication issues when a bearing fault is present. (This is shown in FIG. 22 with an arrow going from between steps 419 and 430 to step 422.) The severity of the lubrication problem is generally dependent upon the MaxPeak value of the originating waveform (step 406) and the Percent Non-Periodic Energy (% NPE) indicated from the associated autocorrelation waveform (step 408).

As shown in FIG. 19, Percent Non-periodic Energy (% NPE) is a function of Percent Periodic Energy and can be determined using the plot of FIG. 19 (step 422). Percent Periodic Energy (% Periodic Energy) is defined as the percentage of energy in the PeakVue (original) spectrum that is related to periodic signals. % NPE is defined as the percentage of energy in the PeakVue (original) spectrum that is related to random vibration signals.

The Lubrication Severity (LS) value is determined according to:

$$LS = \frac{MaxPeak}{2 \times \text{Fault Limit}} \times x \times \% \, NPE,$$

where x is the normalization value (step 426). For the Lubrication Severity gauge shown in FIG. 18, x=10. If the resulting value is greater than x (10 in this example), then the value is truncated to be x.

In an alternative embodiment, instead of determining whether PSP is greater than 0.1 in step 114, it is determined whether % Periodic Energy is greater than Y, where in most cases Y is 50%.

While the preferred embodiment of the algorithm described above and depicted in FIG. 22 uses a PeakVue waveform, the algorithm could be applied to any waveform generated from any type of signal, such as vibration, current, ultrasonic, etc.

Figure 23:
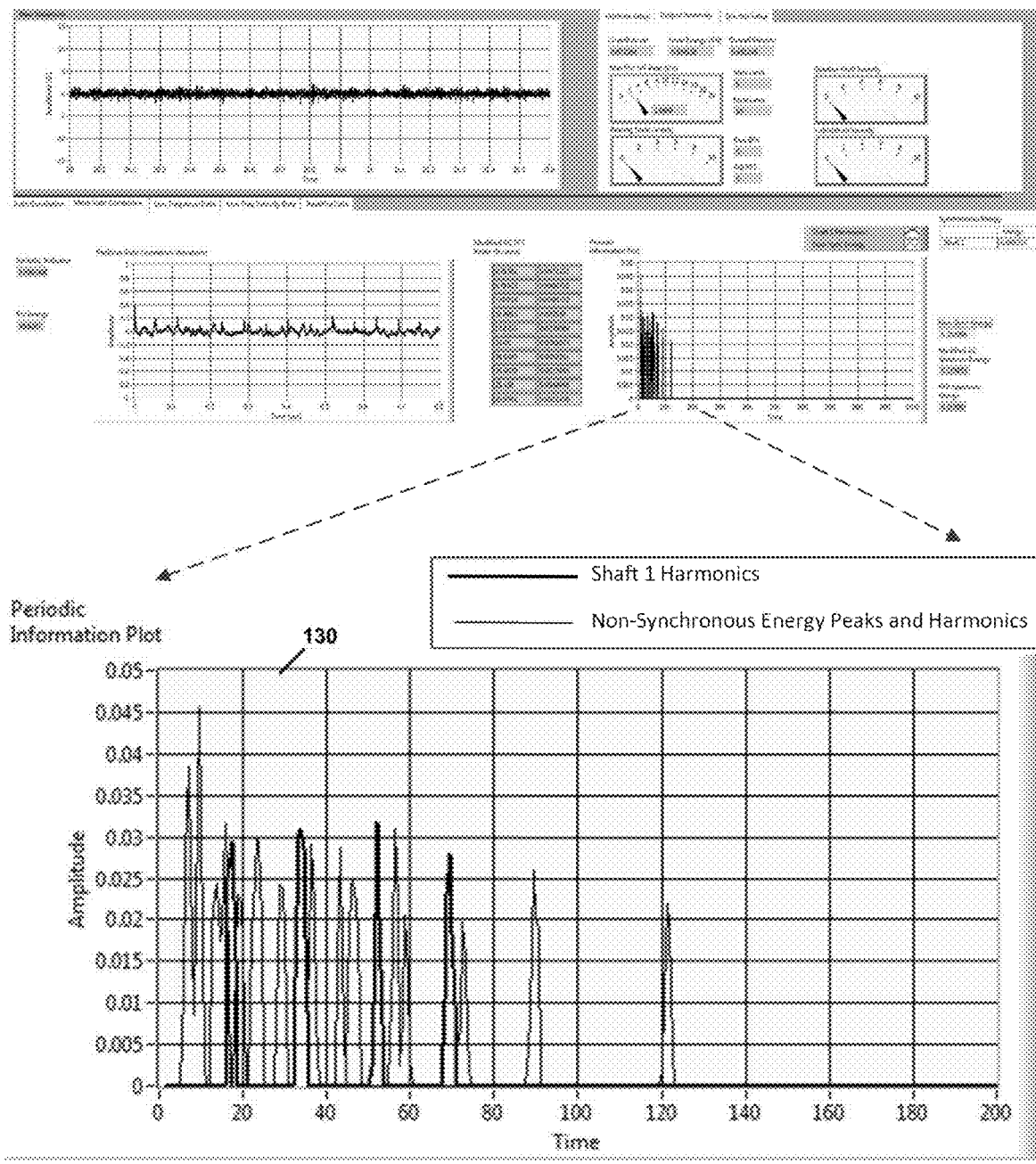
FIG. 23 depicts a graphical display of diagnostic information for a fully-lubricated bearing having no faults.

Following are four examples that demonstrate use of the algorithm of FIG. 22 to determine the status of a bearing under different conditions. FIG. 23 depicts the results for a new, fully-lubricated bearing with no faults. As shown, the gauges for Bearing Fault Severity and Lubrication Severity both indicate a value of zero because the bearing is new and in good condition.

Figure 24:
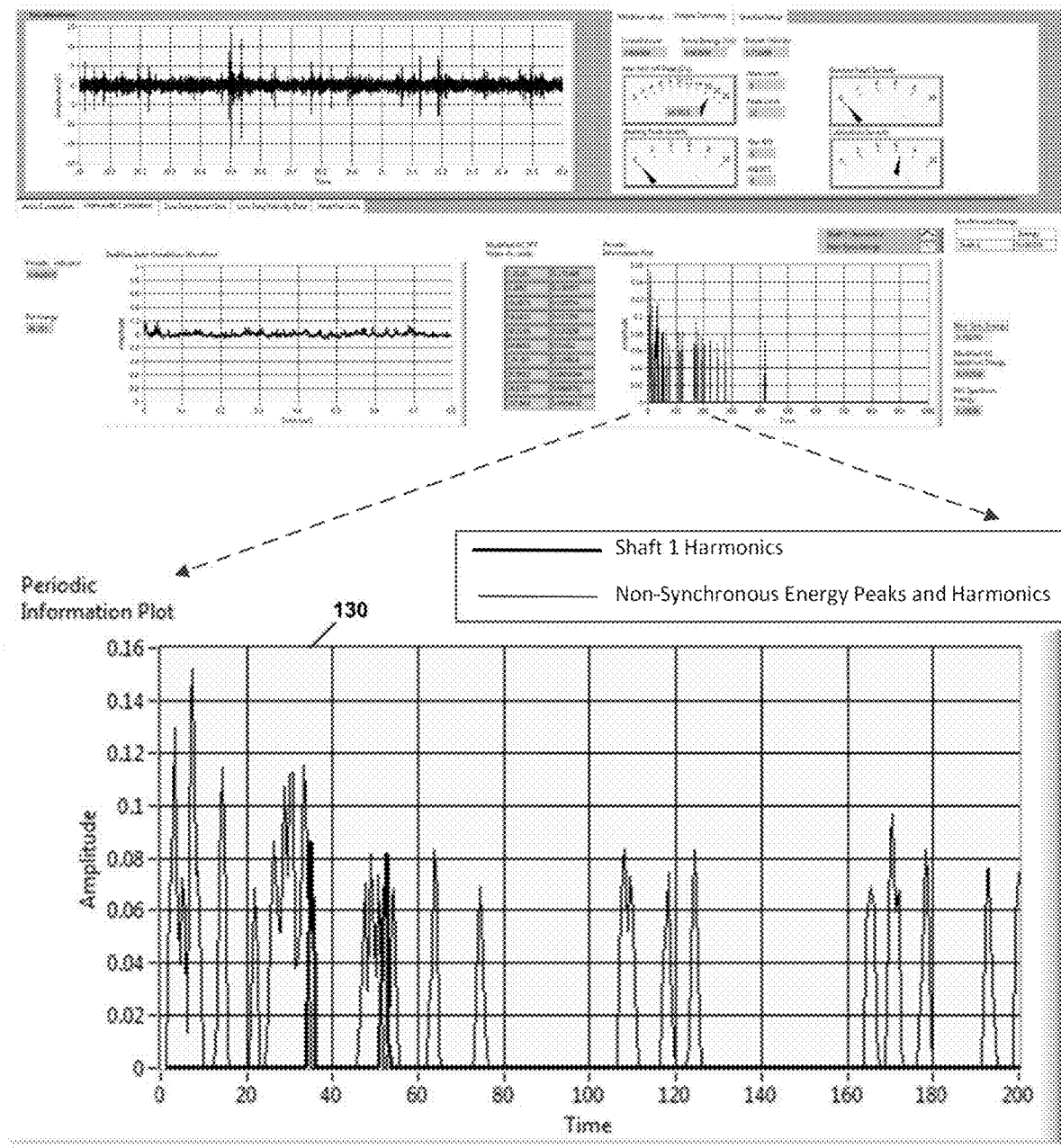
FIG. 24 depicts a graphical display of diagnostic information for a good bearing with no significant faults other than it is running "dry" due to a lack of lubrication.

FIG. 24 depicts the results for a bearing with no faults other than it is running "dry" because there is insufficient lubrication present in the bearing. As shown, the Bearing Fault Severity is still zero but the Lubrication Severity is about 6.5. In this example, the % Periodic Energy is 44.3%. The resulting % NPE based on FIG. 19 is 77.85%. It should be noted that the PSP is 0.0618.

Figure 25:
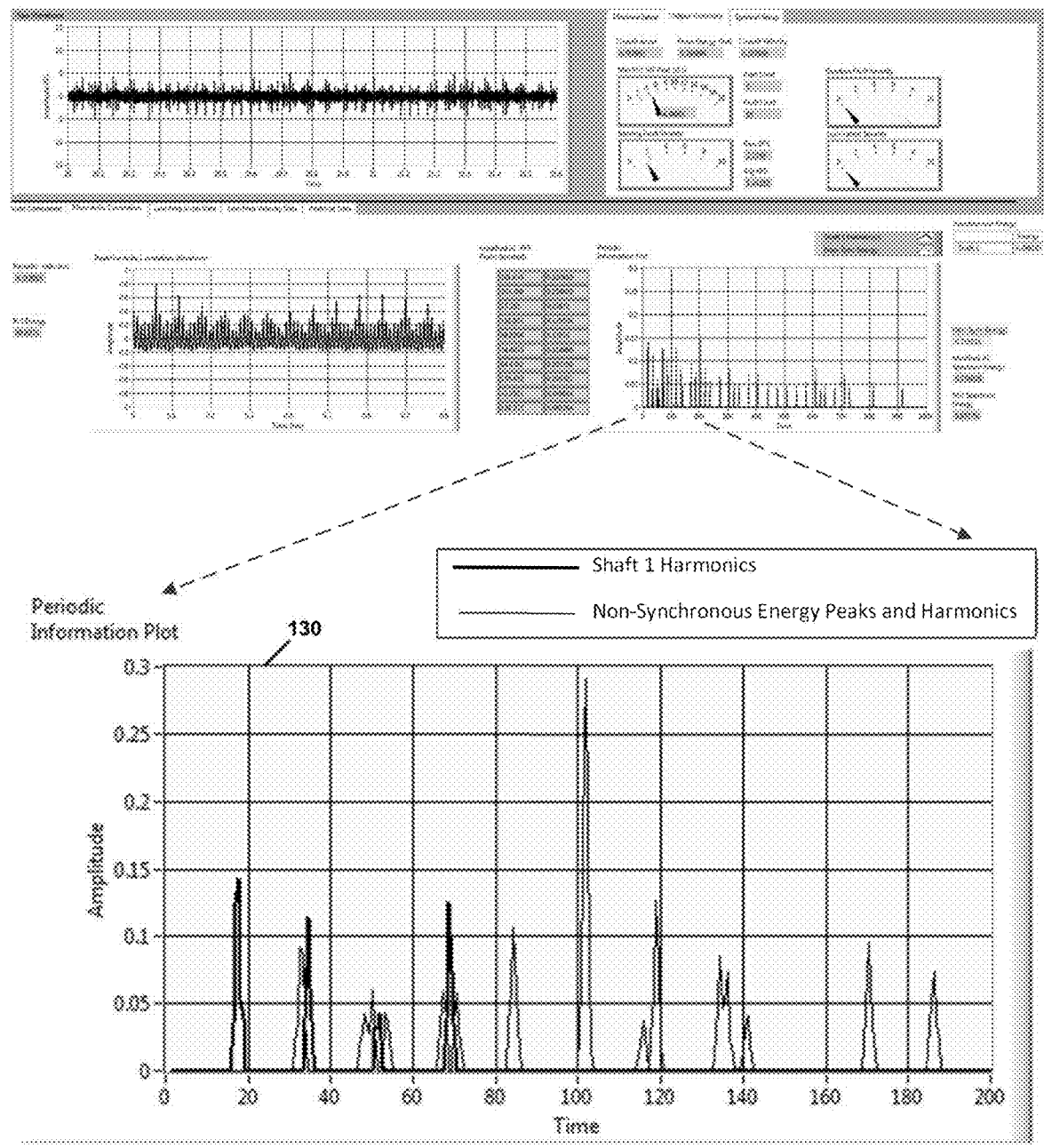
FIG. 25 depicts a graphical display of diagnostic information for a fully-lubricated bearing having an inner race fault.

FIG. 25 depicts the results for a bearing with a small inner race fault and no lubrication problems. As shown, the Bearing Fault Severity is slightly elevated to about 1.4, but the Lubrication Severity is close to zero. In this example, the % Periodic Energy is 88.8%. Based on FIG. 19, the resulting % NPE is 11.2%. It should be noted that the PSP is 0.213 for this example.

Figure 26:
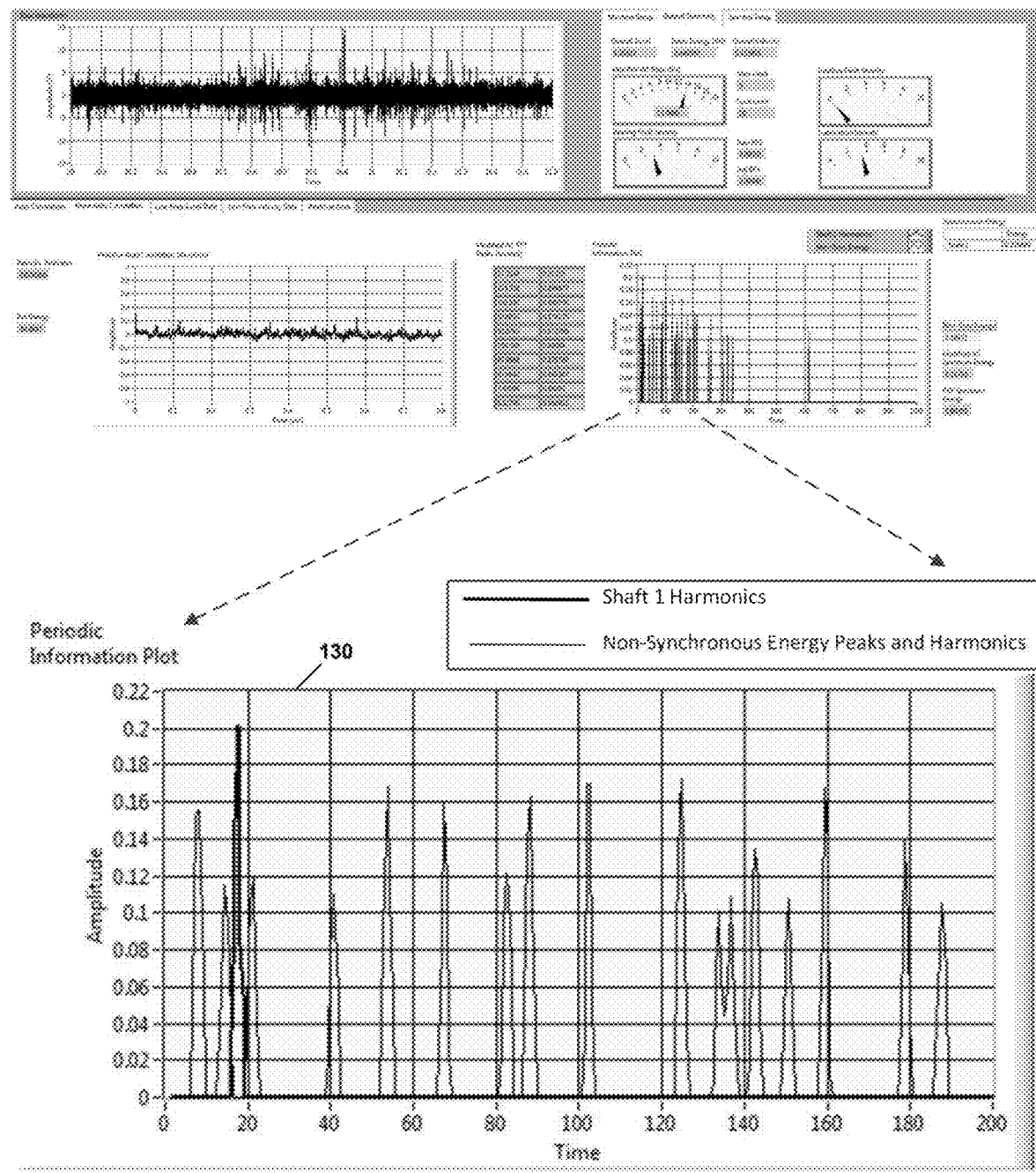
FIG. 26 depicts a graphical display of diagnostic information for a bearing having an inner race fault, and which is running "dry" due to a lack of lubrication.

FIG. 26 depicts the results for a bearing with a small inner race fault as well as a lubrication problem due to the fact that the bearing is running "dry." Even though PSP is 0.074, % Periodic Energy is 51%. Therefore, the signal has some periodicity. As shown, the Bearing Fault Severity is almost 3, while the Lubrication Severity is around 3.25. Those skilled in the art will appreciate that this diagnostic result is an advancement in technology, and could not be determined by other available algorithms. The ability to isolate the lower amplitude non-synchronous signals caused by the mechanical damage to the bearing from the non-periodic energy generated by lack of lubrication, which is significantly higher in amplitude, has not previously been available.

Predicting Gearbox Faults Based on Periodic Signal Parameter (PSP)

Figure 27:
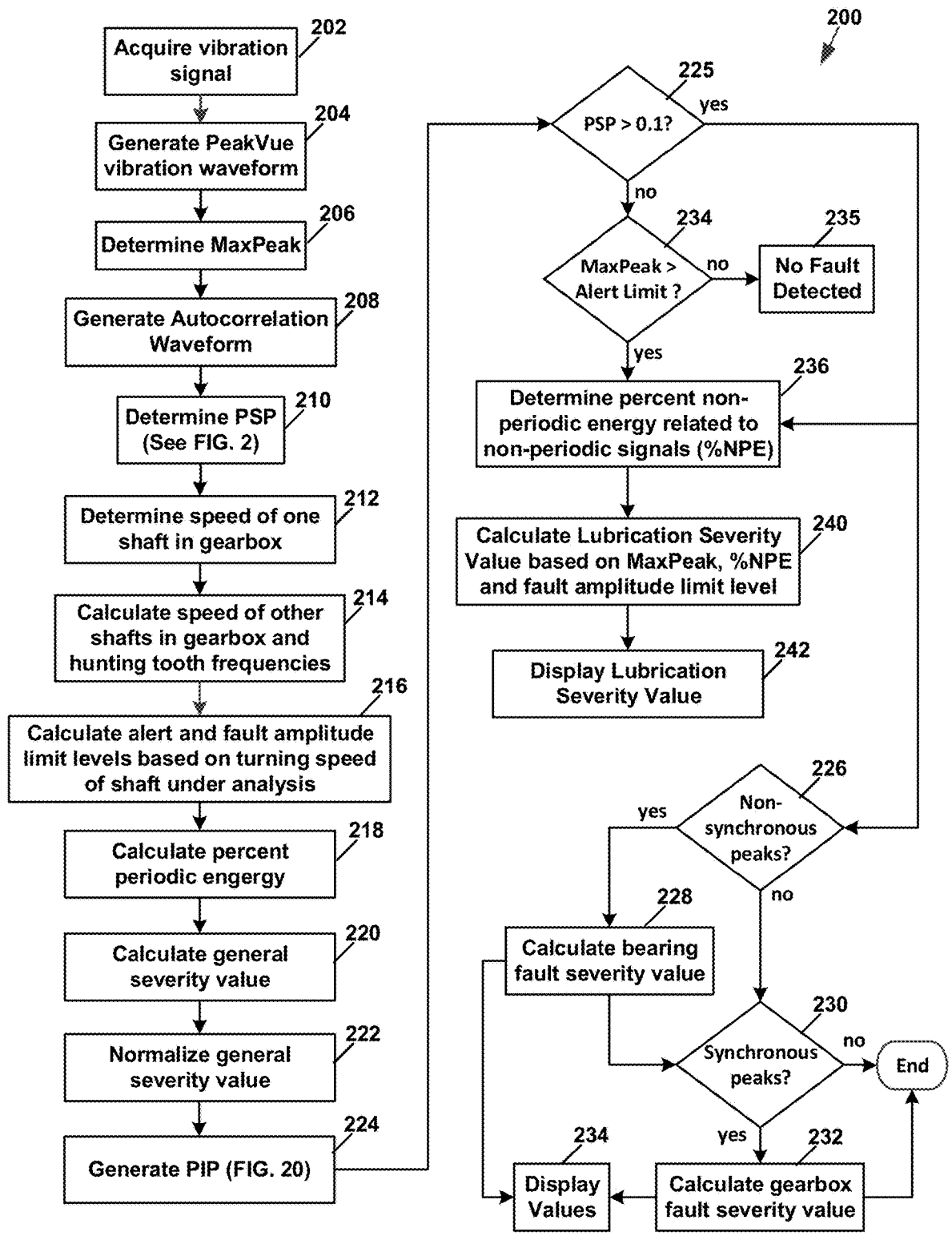
FIG. 27 depicts a flowchart of a method for determining a bearing fault severity value, a gearbox fault severity value, and a lubrication severity value according to a preferred embodiment of the invention.

FIG. 27 depicts steps in a preferred embodiment of a method 200 for generating gearbox fault condition information. A time-domain oversampled vibration waveform is measured, such as using the accelerometer 104 or other sensor attached to the machine 102 being monitored (step 202). A PeakVue™ waveform is then generated, such as by high-pass filtering and peak-hold decimating the oversampled waveform (step 204). The maximum peak amplitude (MaxPeak) of the PeakVue™ waveform is determined (step 206), and its associated autocorrelation waveform is calculated (step 208). Based on the autocorrelation waveform, the periodic signal parameter (PSP) is calculated according to the method depicted in FIG. 2 (step 210).

The rotational speed of at least one of the shafts in the gearbox is measured, such as using a tachometer (step 212), and the speed of each of the other shafts in the gearbox is calculated based on the speed measured in step 212 and knowledge of the gear ratios for the other shafts (step 214). In addition, based on shaft running speeds, hunting tooth frequencies are calculated based on techniques known to those of ordinary skill in the art. In a preferred embodiment, alert amplitude limit levels (in g's) are determined based on the nominal turning speed according to the relationship depicted in FIG. 28, or based on the analyst's experience, or both, as discussed above (step 216). Fault amplitude limit levels are preferably two times the alert levels.

Before calculations of specific severity values can be made, Percent Periodic Energy must be calculated. In a preferred embodiment, Percent Periodic Energy is calculated from the autocorrelation waveform according to:

% Periodic Energy=√MaxPeak(afterfirst3%)

wherein the MaxPeak of the autocorrelation waveform does not include the first 3% of the waveform (step 218). Generally, the Percent Periodic Energy calculation is not as accurate for values less than 50%. Accordingly, as indicated in FIG. 19, the slope of the function for values less than 50% is greater than 1.0.

In order to calculate severity values for different faults, a general severity value is determined. General Severity may be calculated according to:

$$\text{General Severity} = \frac{MaxPeak}{2 \times \text{Fault Limit}} \text{ (step 220)}.$$

The severity value is normalized by multiplying the result of step 220 by a desired maximum gauge value x according to:

Normalized General Severity=General Severity×x (step 222).

For the gauge shown in FIG. 18, where x=10,

Normalized General Severity=General Severity×10.

The PIP is generated using the procedure described herein with reference to FIG. 20 (step 224).

If the PSP is greater than 0.1 (step 225), periodic frequencies related to the gearbox and/or bearings are present.

Based on knowledge of the turning speed, periodic peaks from the periodic information plot (PIP) can be classified as synchronous and non-synchronous. If non-synchronous peaks are present in the PIP (step 226), a bearing fault severity (BFS) value may be calculated (step 228) and displayed (step 234) according to:

$$BFS = \text{Normalized severity (step 222)} \times \left[\left(\frac{(\text{energy of the located nonsynchronous peaks})^2}{(\text{total energy of the associated } PeakVue \text{ spectrum})^2}\right)\right]$$

If synchronous peaks are present (step 230) and fault limits are exceeded, gear teeth degradation is indicated. A gearbox fault severity (GFS) value may be calculated (step 232) and displayed (step 234) according to:

$$GFS = \text{Normalized severity (step 222)} \times \left[\left(\frac{(\text{energy of the located synchronous peaks})^2}{(\text{total energy of the associated } PeakVue \text{ spectrum})^2}\right)\right]$$

If the resulting answer is greater than x (10 in this example), then the answer is truncated to be x.

If PSP≤0.1 and MaxPeak is <alert level, no fault is indicated by the measurement, meaning the asset is in good condition.

If PSP is less than or equal to 0.1 and MaxPeak is greater than the alert amplitude limit level (step 234), a deficiency in bearing and/or gearbox lubrication is indicated. In addition, there may be lubrication issues along with mechanical faults present. (This is shown in FIG. 27 by an arrow going from between steps 225 and 226 to step 236). The severity of the lubrication problem is generally dependent upon the MaxPeak value of the originating waveform (step 206) and the Percent Non-periodic energy (% NPE) indicated from the associated autocorrelation waveform (step 208).

As discussed above, Percent Non-periodic energy (% NPE) is a function of Percent Periodic Energy and can be determined using the plot of FIG. 19 (step 236). Percent Periodic Energy (% Periodic Energy) is defined as the percentage of energy in the PeakVue (original) spectrum that is related to periodic signals. Percent Non-periodic energy is defined as the percentage of energy in the PeakVue (original) spectrum that is related to random vibration signals.

The bearing or gearbox lubrication severity value is determined and displayed according to:

$$\text{Lubrication Severity} = \frac{MaxPeak}{2 \times \text{Fault Limit}} \times x \times \% \ NPE,$$

where x is the normalization value (steps 240 and 242). For the Lubrication Severity gauge shown in FIG. 18, x=10. If the resulting value is greater than x (10 in this example), then the value is truncated to be x.

In an alternative embodiment, instead of determining whether PSP is greater than 0.1 in step 218, it is determined whether % Periodic Energy is greater than Y, where in most cases Y is 50%.

PIP Generation—Third Embodiment

Figure 29A:
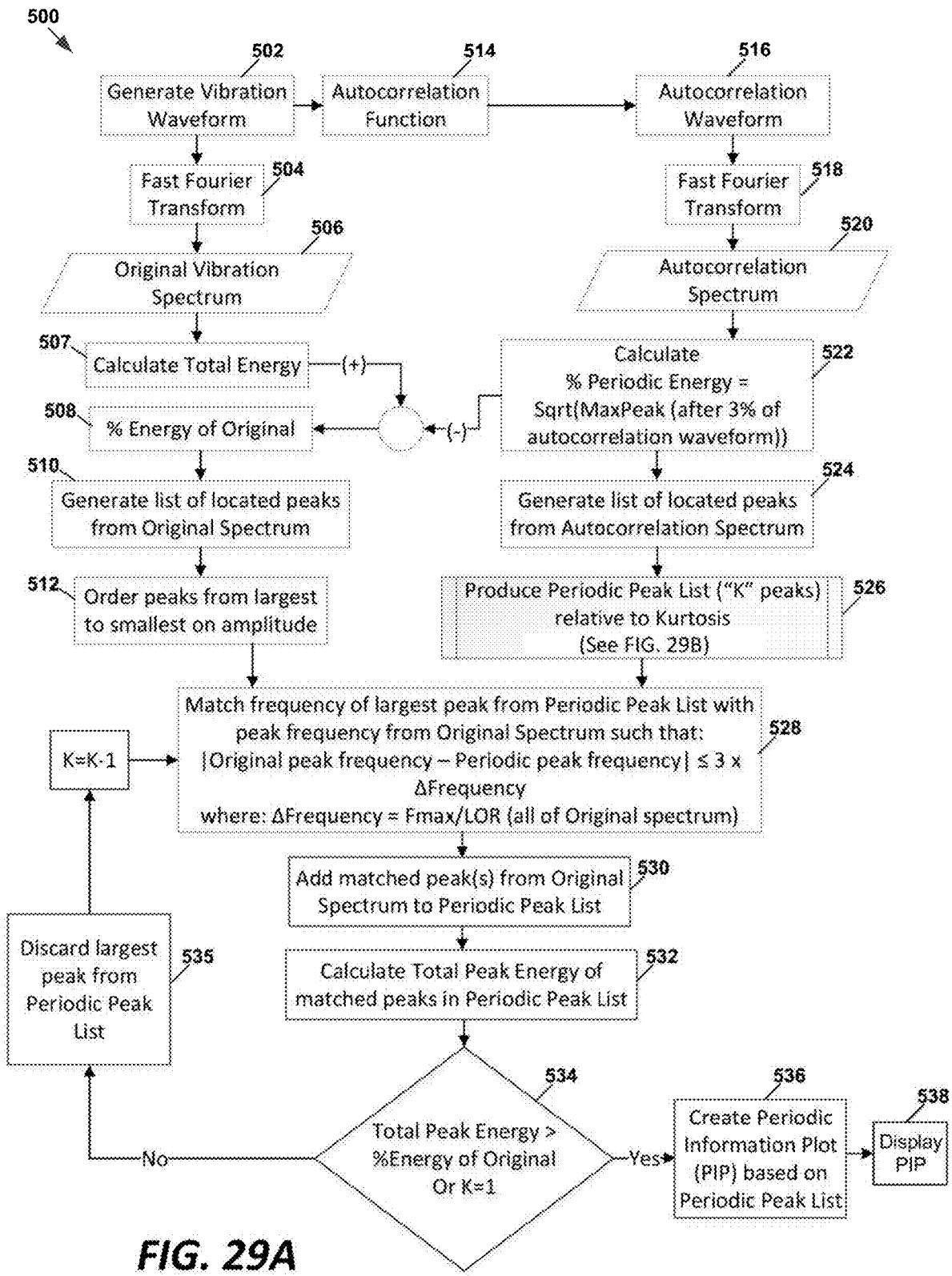
FIGS. 29A and 29B depict a process for generating a Periodic Information Plot according to a third embodiment.
Figure 29B:
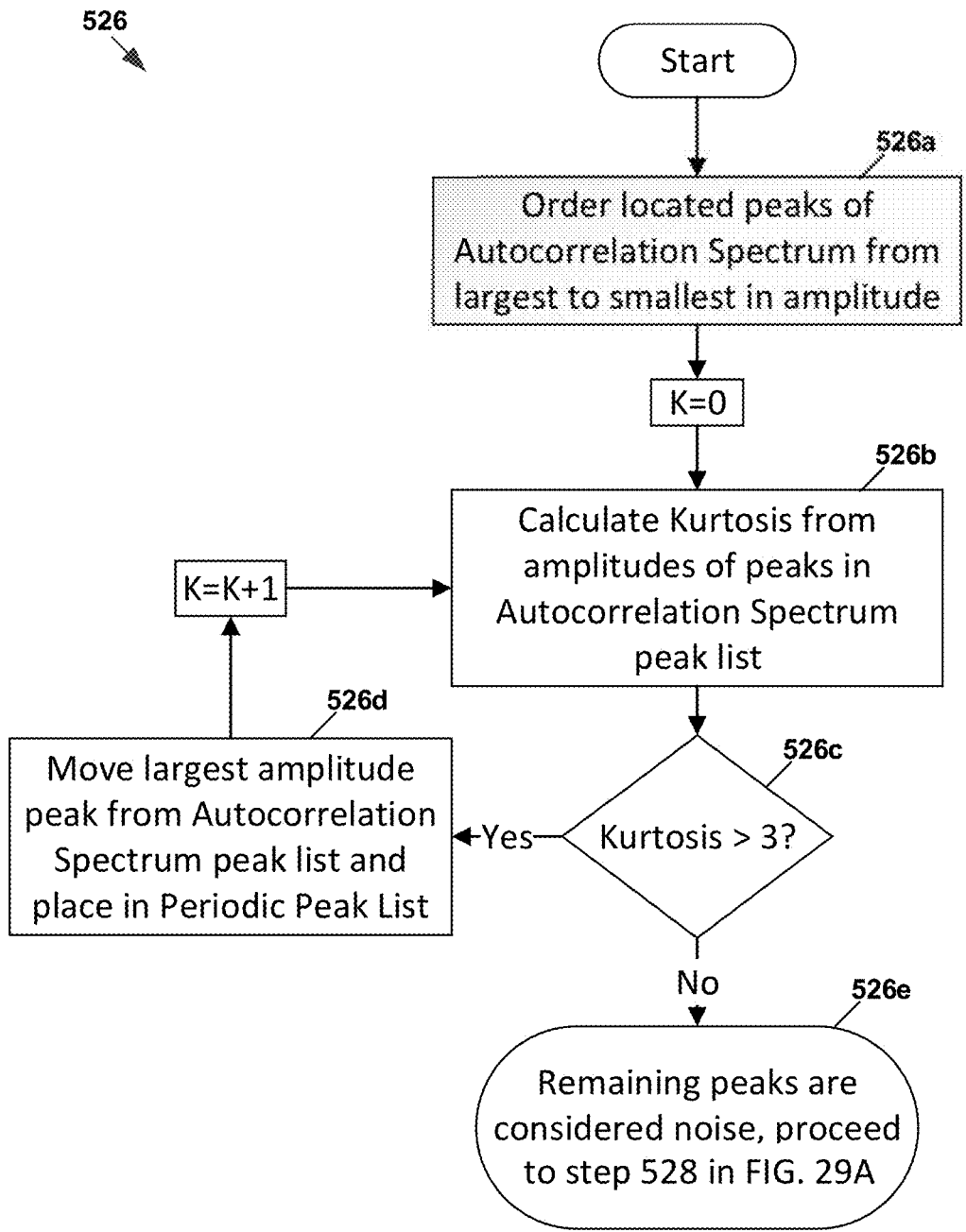

In a third embodiment, a signal is collected from plant equipment (i.e. rotating or reciprocating equipment) and is processed using the method 500 depicted in FIGS. 29A and 29B.

First, a waveform is generated (step 502 of FIG. 29A), such as a vibration waveform acquired using the system depicted in FIG. 1A. If employing a high-pass filter and peak-hold decimation to an oversampled waveform to capture impacting information (such as using the PeakVue™ process), this may be a calculated waveform. An FFT of the vibration waveform is taken (step 504), resulting in a vibration spectrum 506 with frequency on the X-axis and amplitude on the Y-axis, an example of which is shown in FIG. 9. The vibration spectrum 506 may also be referred to herein as the original spectrum to differentiate from the autocorrelation spectrum discussed hereinafter.

The waveform from step 502 is autocorrelated (step 514) to generate an autocorrelation waveform 516, having time on the X-axis and the correlation factor on the Y-axis. An FFT of the autocorrelation waveform 516 is calculated using the same Fmax as was used in the calculation of the FFT of the original waveform (step 518), resulting in an autocorrelation spectrum 320. Using the same Fmax forces the lines of resolution (LOR) of the autocorrelation spectrum 520 to be half of the LOR used in calculating the vibration spectrum 506. Since random events have largely been removed from the autocorrelation waveform 516, the remaining signal in the autocorrelation spectrum 520 is strongly related to periodic events. As shown in FIG. 10, the autocorrelation spectrum has frequency on the X-axis and amplitude related to the correlation factor on the Y-axis. Because the autocorrelation waveform's duration is half that of the original waveform, the associated autocorrelation spectrum has half the lines of resolution compared to the original spectrum.

Percent Periodic Energy (% Periodic Energy) is calculated at step 522 based on the autocorrelation waveform 516 according to:

$$\% \text{ Periodic Energy} = \sqrt{\frac{MaxPeak \text{ (after 3\% of autocorrelation waveform)}}{}}.$$

In a preferred embodiment, the total energy of the vibration spectrum 506 is calculated as the square root of the sum of the squares of each bin value in the vibration spectrum 506 ranging from zero to Fmax (step 507). For purposes of finding bearing and/or gear teeth faults, the original spectrum 506 is the PeakVue spectrum.

The percent energy of the original spectrum 506 is calculated at step 508 according to:

% Energy of Original=Total energy of original spectrum×% Periodic Energy.

A list of the largest peaks from the vibration spectrum 506 is generated, wherein each listed peak is a located peak having a located frequency and an associated located amplitude (step 510). A list of the largest peaks from the autocorrelation spectrum 520 is also generated, wherein each listed peak is a located peak having a located frequency and an associated located amplitude (step 524). In both lists, there may be N number of peaks (such as N=300) that are preferably arranged in order of descending amplitude, such that the peak having the largest amplitude is first in the list and the peak having the smallest amplitude is last (steps 512 and 526).

Further details of step 526 are depicted in FIG. 29B. As noted above, the autocorrelation peak list is preferably sorted in order of descending amplitude, so that the peak with the largest amplitude is first in the list and the peak with the smallest amplitude is last (step 526a). Based on kurtosis, statistically significant peaks are culled out from the autocorrelation peak list to create a periodic peak list. To produce the periodic peak list, first the kurtosis is calculated from the amplitudes of the peaks in the autocorrelation peak list generated in step 524 (step 526b). If the kurtosis is greater than 3 (step 526c), the largest peak in the autocorrelation peak list is removed and placed into the periodic peak list (step 526d). Steps 526b through 526d are repeated until the kurtosis for the remaining peaks in the autocorrelation peak list is less than or equal to 3. Since the kurtosis is less than or equal to 3 for the peaks remaining in the autocorrelation peak list, those remaining peaks are considered to be noise and are not used in the calculation of the Periodic Information Plot. The resulting periodic peak list (having K number of peaks) will be used in determining the Periodic Information Plot, as described hereinafter.

For the frequency value of each of the K number of peaks in the periodic peak list, an associated matching peak is found in the peak list generated for the vibration spectrum 506 (step 528). For a peak to "match," the frequency value of the peak from the vibration spectrum 506 must be within N×ΔFrequency of the frequency value of the peak from the periodic peak list, where in a preferred embodiment N=3 and ΔFrequency is expressed as:

$$\Delta Frequency = \frac{F\max \text{ of vibration spectrum}}{LOR \text{ of vibration spectrum}}.$$

Thus, a match exists when

|original peak frequency−periodic peak list peak frequency|≤N×ΔFrequency.

The total number of matches may be designated as M.

For each matching peak from the vibration spectrum 506 found in step 528, the values of the located frequency and located amplitude is added to the periodic peak list (step 530). As each matching peak is added to the periodic peak list, a running Total Peak Energy value of all peaks in the periodic peak list is calculated (step 532). Because a Hanning window is used in the FFT calculation for this embodiment, the energy of a located peak is the result of energy from three bin values used in the creation of the located peak.

For each Total Peak Energy value that is less than or equal to the % Energy of the original vibration spectrum (calculated at step 508), the associated largest peak (from step 350) is discarded from the periodic peak list before returning to step 528 (step 535). This process of matching peaks and adding matched peaks to the periodic peak list continues until the number of iterations equal K, or the Total Peak Energy is greater than or equal to the % Energy of the original vibration spectrum, whichever event occurs first (step 534).

Figure 30:
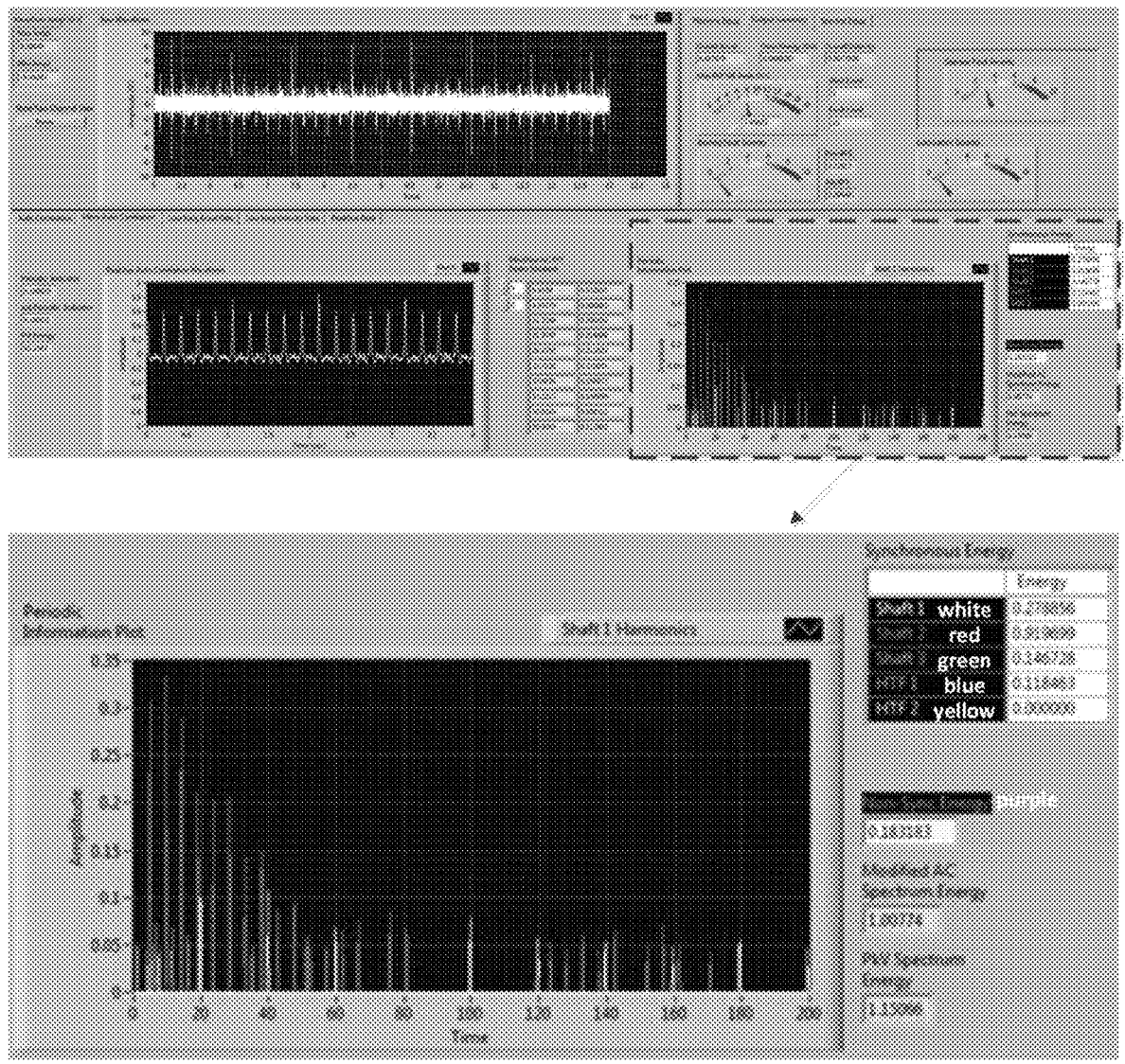
FIG. 30 depicts a display of vibration information indicating a broken tooth on a first bull gear of a two-stage gearbox, which information includes a Periodic Information Plot generated according to the third embodiment.

The Periodic Information Plot (PIP) is created by plotting the three points associated with each peak in the periodic peak list (step 536). The three points correspond to three bins associated with each located peak, assuming a Hanning window is used for FFT calculations. In a preferred embodiment, P number of PIP peaks are plotted starting with the first peak in the periodic peak list, wherein the number P is the maximum desired number of peaks to be plotted, and P≤M. For example, in the case of a CSI 9420 Wireless Vibration Transmitter, only twenty peaks (P=20) may be displayed for a "thumbnail" plot. An example of a PIP created using the method 500 of FIGS. 29A and 29B is depicted in FIG. 30.

Periodic Peaks

The periodic peaks in a spectrum are classified as either synchronous or non-synchronous peaks, as defined below.

Synchronous periodic peaks are all running speed peaks and their harmonics. For a gearbox, there are several families of synchronous periodic peaks—one family associated with the speed of each shaft in a gearbox. In addition to running speed peaks, synchronous periodic peaks are also defined for a gearbox as all hunting tooth fundamental frequencies and their harmonics.

Non-synchronous periodic peaks are any periodic family of harmonic peaks that are not members of a synchronous family. Most non-synchronous periodic peaks are related to bearing frequencies.

It is very important to obtain the correct turning speed (and associated turning speeds of other shafts for gearboxes) of the machine being evaluated. As for any analysis, incorrect speed will produce incorrect locations of the synchronous and non-synchronous periodic peaks. Precise speeds are typically obtained from tachometer/strobe outputs or manual analysis of spectra. If the precise speed is unknown, a Speed Detection Algorithm should be employed.

Because there may be many families of peaks related to either synchronous or non-synchronous periodic peaks, a color scheme may be devised to separate the different family of peaks. By color coding the different families of peaks, it is easy to distinguish frequencies related to bearings (non-synchronous) from those related to running speed. In a gearbox, these running speed harmonic families (synchronous) can lead to the discovery of gear teeth problems. Using colors to designate the different families of periodic peaks in the Periodic Information Plot simplifies analysis for both the novice and experienced analyst.

The use of colors to designate the different families of periodic peaks is depicted in FIG. 30, which shows an example of the presence of a broken tooth on a two-stage gearbox. The presence of synchronous and non-synchronous periodic peaks are notable in the Periodic Information Plot (PIP). Synchronous families include the running speed fundamental and/or harmonics of "Shaft 1" (plotted in white), "Shaft 2" (plotted in red), and "Shaft 3" (plotted in green). In addition, other synchronous families of peaks include hunting tooth fundamental frequencies and their harmonics "HTF 1" (plotted in blue) and "HTF 2" (plotted in yellow). Non-synchronous families of periodic peaks are plotted in purple. The red-colored frequencies in the PIP make up an overwhelming portion of the synchronous family of periodic peaks related to the second shaft in the gearbox. The bull gear on the second shaft has a broken tooth.

Figure 31:
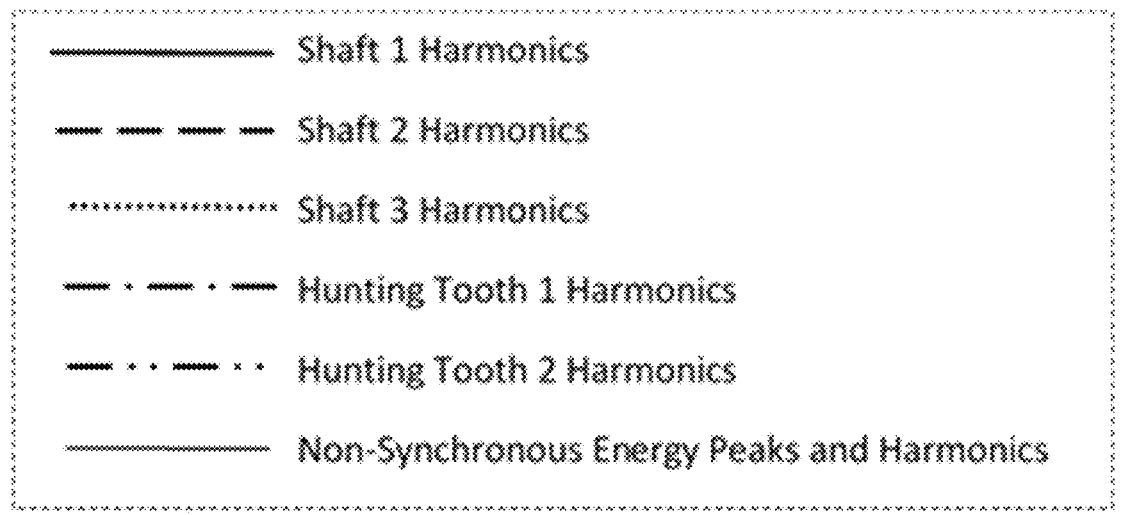
FIG. 31 depicts an alternative method for designating families of peaks using lines with different line thicknesses and/or patterns.
Figure 32:
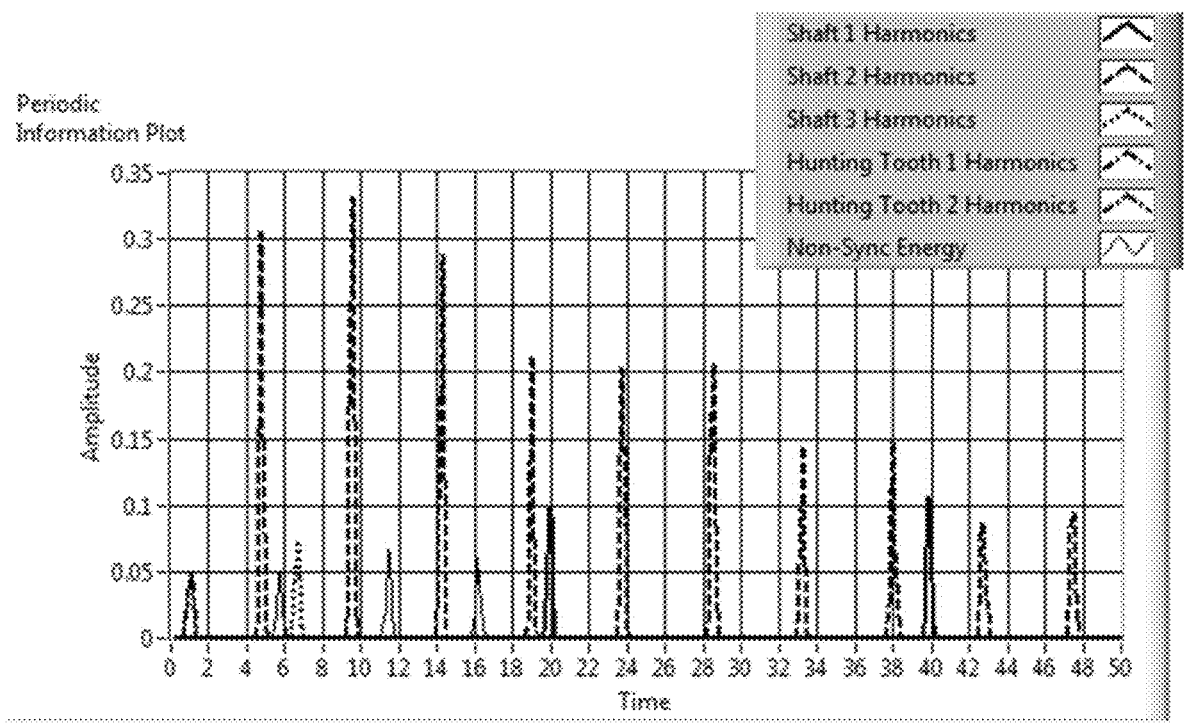
FIG. 32 depicts a Periodic Information Plot generated according to an embodiment of the invention wherein families of peaks are indicated using lines with different line thicknesses and/or patterns.

An alternative to using color is to display each family of peaks with a different line thickness and/or pattern, an example of which is depicted in FIG. 31. FIG. 32 depicts an example of the use of differing line thicknesses and/or patterns for the same PIP as shown in FIG. 30.

Although preferred embodiments described herein are applied to PeakVue™ vibration data, the techniques can be applied to any analysis in which random (noise) data is to be separated from desired informative data. Examples include analysis of acceleration and/or velocity vibration data.

Embodiments described herein also have application in analysis of vibration of pumps due to cavitation. Cavitation in pumps causes vibration signals that are random in nature and therefore appear as noise in an FFT spectrum. This randomness implies that vibration signals caused by cavitation are not periodic in nature, and therefore can be separated from the periodic signals using the processes described herein.

Cavitation appears in the FFT as noise (random signals) about the blade pass frequency of a pump, which is the number of fan blades in the pump multiplied by the running speed. Cavitation may also show up as high frequencies that are detectable as non-periodic signals using PeakVue™ waveform analysis. The basic periodicity algorithms described in U.S. Pat. No. 9,791,422 and US Patent Publication No. 2018/0011065A1 may be used to isolate these indicators of cavitation. Autocorrelation can be applied to both velocity, acceleration, and PeakVue™ waveforms to isolate the randomness generated by cavitation.

Generally, the detection of cavitation differs from the detection of bearing or gear defects in that auto-correlation must be applied to velocity waveforms and the "non-periodic" indicator must be trended to see changes in the non-periodicity.

The foregoing description of preferred embodiments for this invention has been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for acquiring and analyzing periodic information in vibration associated with a machine, the apparatus comprising:
    a vibration sensor attached to the machine that generates a vibration signal;
    a data collector in communication with the vibration sensor that receives and conditions the vibration signal, the data collector including an analog-to-digital converter for converting the vibration signal to digital vibration data; and
    a processor that receives the digital vibration data and executes operational instructions for processing the digital vibration data to:
        generate a vibration waveform based on the digital vibration data;
        perform an autocorrelation function on the vibration waveform to generate an autocorrelation waveform;
        perform a Fast Fourier Transform on the vibration waveform to generate a vibration spectrum that includes vibration amplitude peaks;
        perform a Fast Fourier Transform on the autocorrelation waveform to generate an autocorrelation spectrum that includes autocorrelation amplitude peaks;
        compile a first list of the vibration amplitude peaks from the vibration spectrum;
        compile a periodic peak list of the autocorrelation amplitude peaks that includes only autocorrelation amplitude peaks that are not associated with noise in the vibration waveform;
        generate a peak list by sequentially adding to the peak list each vibration amplitude peak from the first list that matches an autocorrelation amplitude peak in the periodic peak list;
        as vibration amplitude peaks are added to the peak list, determine a total amount of peak energy associated with the vibration amplitude peaks in the peak list; and
        after the total amount of peak energy exceeds a predetermined threshold, generate a periodic information plot comprising the vibration amplitude peaks in the peak list.

2. The apparatus of claim 1 wherein the processor is configured to execute operational instructions to compile the periodic peak list of autocorrelation amplitude peaks by:
    (a) compiling a second list of autocorrelation amplitude peaks that includes a plurality of largest autocorrelation amplitude peaks from the autocorrelation spectrum;
    (b) calculating a kurtosis value based on amplitudes of all peaks in the second list;
    (c) if the kurtosis value is greater than a kurtosis threshold, moving a peak that has an amplitude larger than amplitudes of any other peaks in the second list from the second list to the periodic peak list; and
    (d) repeating steps (b) and (c) until the kurtosis value is less than or equal to the kurtosis threshold.

3. The apparatus of claim 2 wherein the kurtosis threshold is 3.

4. The apparatus of claim 1 wherein the predetermined threshold comprises a percent energy value, and wherein the processor is configured to execute operational instructions for calculating the percent energy value according to $$\% \text{ Energy of Original} = \text{Total energy of vibration spectrum} \times \% \text{ Periodic Energy}$$

wherein $$\% \text{ Periodic Energy} = \sqrt{\frac{MaxPeak \text{ (after first 3\% of autocorrelation waveform)}}{}}$$

and wherein MaxPeak (after 3% of autocorrelation waveform) comprises a maximum absolute peak in the autocorrelation waveform occurring outside the first 3% of the autocorrelation waveform.

5. The apparatus of claim 1 wherein the vibration waveform is a PeakVue waveform.

6. The apparatus of claim 1 wherein the processor is configured to execute operational instructions to arrange the amplitude peaks in the first list and periodic peak list in order of descending amplitude, such that a largest amplitude peak is first and a smallest amplitude peak is last.

7. The apparatus of claim 1 wherein the processor is configured to execute operational instructions to classify the amplitude peaks as synchronous peaks and nonsynchronous peaks, to assign one or more first display colors to the synchronous peaks in the periodic information plot, and to assign one or more second display colors to the nonsynchronous peaks in the periodic information plot, wherein the first display colors are different from the second display colors.

8. The apparatus of claim 1 wherein the processor is configured to execute operational instructions to separate amplitude peaks that are synchronous peaks into multiple families and to assign a different display color to each family of synchronous peaks in the periodic information plot.

9. The apparatus of claim 1 further comprising:
a data communication network to which the processor is connected and through which the periodic information plot is communicated; and
an analyst computer connected to the data communication network, the analyst computer for receiving and displaying the periodic information plot for viewing by an analyst.

10. The apparatus of claim 1 wherein the processor determines a match between an autocorrelation amplitude peak from the periodic peak list and a vibration amplitude peak from the first list when

|vibration peak–frequency autocorrelation peak frequency|≤$n$×ΔFrequency, where the vibration peak frequency is a frequency value of the vibration amplitude peak from the first list, the autocorrelation peak frequency is a frequency value of the autocorrelation amplitude peak from the periodic peak list, n is an integer value, and ΔFrequency is determined according to:

$$\Delta\text{Frequency} = \frac{F\text{max of vibration spectrum}}{LOR \text{ of vibration spectrum}},$$

where Fmax is the maximum frequency of the vibration spectrum and LOR is the number of lines of resolution in the vibration spectrum.

11. The apparatus of claim 1 wherein the data collector comprises a digital data recorder or a vibration data collector.

12. The apparatus of claim 1 wherein the processor is a component of the data collector or is a component of an analyst computer that is in communication with the data collector via a communication network.

13. A computer-implemented method for analyzing periodic information in digital vibration data collected for machine performance analysis, the method comprising:
(a) generating a vibration waveform based on the digital vibration data;
(b) performing a Fast Fourier Transform on the vibration waveform to generate a vibration spectrum;
(c) compiling a periodic peak list of vibration amplitude peaks by statistically separating periodic peaks from noise peaks in the vibration spectrum, the compiling including:
(c1) generating an initial list of vibration amplitude peaks that includes a plurality of largest vibration amplitude peaks from the vibration spectrum;
(c2) calculating a kurtosis value based on amplitudes of all the vibration amplitude peaks in the initial list;
(c3) if the kurtosis value is greater than a kurtosis threshold, moving from the initial list to the periodic peak list a vibration amplitude peak having an amplitude that is larger than amplitudes of any other peaks in the initial list; and
(c4) repeating steps (c2) and (c3) until the kurtosis value is less than or equal to the kurtosis threshold; and
(d) plotting on a display device machine vibration information comprising or derived from the vibration amplitude peaks in the periodic peak list.

14. The method of claim 13 wherein the kurtosis threshold is 3.

15. The method of claim 13 wherein step (a) further comprises performing an autocorrelation function on the vibration waveform to generate an autocorrelation waveform and step (b) comprises performing a Fast Fourier Transform on the autocorrelation waveform to generate the vibration spectrum is an autocorrelation spectrum.

16. The method of claim 13 wherein step (d) comprises plotting machine vibration information that is indicative only of periodic information in the digital vibration data.

17. The method of claim 13 wherein the digital vibration data are indicative of vibration of a pump, and step (d) comprises plotting machine vibration information that is indicative of cavitation in the pump.

18. A computer-implemented method for analyzing periodic information in digital vibration data associated with a machine collected for machine performance analysis, the method comprising:
(a) generating a vibration waveform based on the digital vibration data;
(b) performing a Fast Fourier Transform on the vibration waveform to generate a vibration spectrum;
(c) identifying periodic vibration amplitude peaks in the vibration spectrum;
(d) determining a running speed of the machine;
(e) classifying each of the periodic vibration amplitude peaks as a synchronous peak or a nonsynchronous peak, wherein periodic vibration amplitude peaks that are harmonically related to the running speed are classified as synchronous peaks, and periodic vibration amplitude peaks that are not harmonically related to the running speed are classified as nonsynchronous peaks;
(f) plotting the synchronous peaks on a display device in one or more first display colors or one or more first line styles; and
(g) plotting the nonsynchronous peaks on the display device in one or more second display colors or one or more second line styles that are different from the first display colors and first line styles.

19. The method of claim 18 further comprising separating the periodic vibration amplitude peaks that are classified as synchronous peaks into multiple families, wherein step (f) comprises plotting each family of synchronous peaks in a first display color or first line style that is different from first display colors or first line styles in which other families of synchronous peaks are displayed.

\* \* \* \* \*